US012807220B2

(12) United States Patent
Das et al.

(10) Patent No.: US 12,807,220 B2
(45) Date of Patent: Nov. 24, 2026

(54) METHODS AND APPARATUS TO ADJUST A STEERING ANGLE OF A VEHICLE IN A SELF-DRIVING MODE

(71) Applicant: Ford Global Technologies, LLC, Dearborn, MI (US)

(72) Inventors: Ashrit Das, Canton, MI (US); Yijun Li, Dearborn, MI (US); Tomas Mawyin, Livonia, MI (US); Lodewijk Wijffels, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 18/491,557

(22) Filed: Oct. 20, 2023

(65) Prior Publication Data

US 2025/0128760 A1 Apr. 24, 2025

(51) Int. Cl.
*B62D 6/00* (2006.01)
*B60W 60/00* (2020.01)

(52) U.S. Cl.
CPC ........... *B62D 6/002* (2013.01); *B60W 60/001* (2020.02); *B60W 2510/202* (2013.01); *B60W 2510/22* (2013.01); *B60W 2520/10* (2013.01); *B60W 2710/207* (2013.01)

(58) Field of Classification Search
CPC ...... B62D 6/002; B62D 5/0463; B62D 5/046; B62D 5/0469; B62D 6/00; B62D 6/007; B60W 60/001; B60W 2510/202; B60W 2510/22; B60W 2520/10; B60W 2710/207
USPC ............................................................ 701/23
See application file for complete search history.

(56) References Cited

U.S. PATENT DOCUMENTS 6,282,472 B1 * 8/2001 Jones .................. B62D 5/0463 180/443
7,530,422 B2 5/2009 Bolourchi et al.
7,676,310 B2 3/2010 Klein et al.
8,714,047 B2 5/2014 Yamamoto
(Continued)

FOREIGN PATENT DOCUMENTS

JP 5321906 B2 10/2013

OTHER PUBLICATIONS

Altair Hyperworks, “Electric Power Assisted Steering System,” 2021, 12 pages, retrieved from <https://2021.help.altair.com/2021/hwdesktop/hwx/topics/motionview/eletric_power_assisted_steering_sys_r.htm> on May 18, 2023.
(Continued)

*Primary Examiner* — Ramya P Burgess
*Assistant Examiner* — Preston Jay Miller
(74) *Attorney, Agent, or Firm* — Lorne Forsythe; Hanley, Flight & Zimmerman, LLC

(57) ABSTRACT

Examples include methods and apparatus to adjust a steering angle of a vehicle in a self-driving mode. An example vehicle includes a steering controller including instructions and programmable circuitry to execute the instructions to access a path follower (PF) angle request, generate a virtual boost curve (VBC) angle request based on a torque input to a steering wheel, determine an angle blending weight based on the torque input and a speed of the vehicle, determine a final angle request based on the PF angle request, the VBC angle request, and the angle blending weight, and convert the final angle request to a torque request to be used to adjust a steering angle of the vehicle via a motor.

20 Claims, 18 Drawing Sheets

(56) References Cited

U.S. PATENT DOCUMENTS

| | | | |
|---|---|---|---|
| 9,616,928 | B2 | 4/2017 | Lavoie et al. |
| 10,077,056 | B1 | 9/2018 | Fields et al. |
| 10,106,190 | B2 | 10/2018 | Bremkens et al. |
| 10,139,824 | B2 | 11/2018 | Sako et al. |
| 10,703,407 | B2 | 7/2020 | Maeda |
| 11,572,096 | B2 | 2/2023 | Suzuki |
| 11,919,580 | B2 | 3/2024 | Yang et al. |
| 12,084,121 | B2 | 9/2024 | Albrecht et al. |
| 2005/0240328 | A1 | 10/2005 | Shirato et al. |
| 2006/0025911 | A1 | 2/2006 | Yao et al. |
| 2011/0010054 | A1 | 1/2011 | Wilson-Jones |
| 2012/0046832 | A1 | 2/2012 | Kariatsumari et al. |
| 2016/0375923 | A1 | 12/2016 | Schulz et al. |
| 2019/0031235 | A1 | 1/2019 | Lee et al. |
| 2019/0286127 | A1 | 9/2019 | Watanabe et al. |
| 2020/0031344 | A1 | 1/2020 | Okano et al. |
| 2020/0216115 | A1* | 7/2020 | Jiang ........................ B62D 6/08 |
| 2020/0317261 | A1* | 10/2020 | Shoji ..................... B60W 50/14 |
| 2020/0346686 | A1 | 11/2020 | Schäfer |
| 2022/0055685 | A1* | 2/2022 | Kim .................... B60W 30/045 |
| 2022/0281473 | A1 | 9/2022 | LaBarbera et al. |
| 2023/0014442 | A1 | 1/2023 | Bahena et al. |
| 2024/0253694 | A1 | 8/2024 | Lee |
| 2024/0343302 | A1 | 10/2024 | Kunihiro et al. |
| 2025/0033695 | A1 | 1/2025 | Roeckner et al. |
| 2025/0263119 | A1 | 8/2025 | Das et al. |

OTHER PUBLICATIONS

Erdelyi et al., Virtual Prototyping of an Automobile Steering System Using Haptic Feedback, Sensors, Signals, Visualization, Imaging, Simulation and Materials, Nov. 2009, 7 pages.

United States Patent and Trademark Office, "Non-Final Office Action," issued in connection with U.S. Appl. No. 18/444,511, dated Aug. 18, 2025, 7 pages.

United States Patent and Trademark Office, "Notice of Allowance and Fee(s) Due," issued in connection with U.S. Appl. No. 18/444,511, dated Nov. 21, 2025, 8 pages.

Jha et al., "Sensors, Signals, Visualization, Imaging, Simulation and Materials," Recent Advances in Electrical Engineering, WSEAS Press, Nov. 2009, 22 pages.

Dillmann et al., "Keeping the Driver in the Loop in Conditionally Automated Driving: A Perception-Action Theory Approach," Transportation Research, Part F: Traffic Psychology and Behavior, vol. 79, May 2021, 14 pages.

Warner et al., "Shared space: Motorists' perspective," Transportation Research, Part F: Traffic Psychology and Behavior, vol. 79, 2024, 12 pages.

United States Patent and Trademark Office, "Corrected Notice of Allowability," issued in connection with U.S. Appl. No. 18/444,511, dated Feb. 17, 2026, 2 pages.

United States Patent and Trademark Office, "Non-Final Office Action," issued in U.S. Appl. No. 18/980,934, dated Mar. 26, 2026, 16 pages.

United States Patent and Trademark Office, "Corrected Notice of Allowability," issued in connection with U.S. Appl. No. 18/444,511, dated Apr. 20, 2026, 2 pages.

* cited by examiner

METHODS AND APPARATUS TO ADJUST A STEERING ANGLE OF A VEHICLE IN A SELF-DRIVING MODE

FIELD OF THE DISCLOSURE

This disclosure relates generally to vehicle control and, more particularly, to methods and apparatus to adjust a steering angle of a vehicle in a self-driving mode.

BACKGROUND

In recent years, some vehicles have been outfitted with automated driving systems that can automatically drive or steer the vehicle in a self-driving mode. These systems include a path follower controller that analyzes the road ahead (e.g., using one or more cameras and or Map based systems) and determines how to steer the vehicle along a target path based on the analysis. The path follower controller determines a torque to be applied by a steering motor to the steering system to steer the vehicle. In some instances, while in the self-driving mode, the driver may still need to manually steer the vehicle. Therefore, the driver may apply an input torque to the steering wheel. While in the self-driving mode, the power steering controller uses the torque from the path follower controller and the input torque from the driver to determine a final torque to be applied by the motor to steer the vehicle. As such, the driver can still at least partially control the vehicle while in the self-driving mode.

SUMMARY

An example vehicle disclosed herein includes a steering wheel, a steerable wheel, the steering wheel operatively coupled to the steerable wheel, and a steering motor to be activated to control a steering angle of the steering wheel while the vehicle is in a self-driving mode. The vehicle also includes a steering controller including instructions and programmable circuitry to execute the instructions to: access a path follower (PF) angle request; generate a virtual boost curve (VBC) angle request based on a torque input to the steering wheel by a driver; determine an angle blending weight based on the torque input and a speed of the vehicle; determine a final angle request based on the PF angle request, the VBC angle request, and the angle blending weight; and convert the final angle request to a torque request to be used to adjust the steering angle via the motor.

Disclosed herein is an example non-transitory machine readable storage medium that includes instructions to cause programmable circuitry to at least: access a path follower (PF) angle request; generate a virtual boost curve (VBC) angle request based on a torque input to a steering wheel of a vehicle by a driver; determine an angle blending weight based on the torque input and a speed of the vehicle; determine a final angle request based on the PF angle request, the VBC angle request, and the angle blending weight; and convert the final angle request to a torque request to be used to adjust a steering angle of the steering wheel while the vehicle is in a self-driving mode.

An example method disclosed herein includes accessing a path follower (PF) angle request, generating a virtual boost curve (VBC) angle request based on a torque input to a steering wheel of a vehicle by a driver, determining an angle blending weight based on the torque input and a speed of the vehicle, determining a final angle request based on the PF angle request the VBC angle request, and the angle blending weight, and converting the final angle request to a torque request to be used to adjust a steering angle of the steering wheel of the vehicle.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
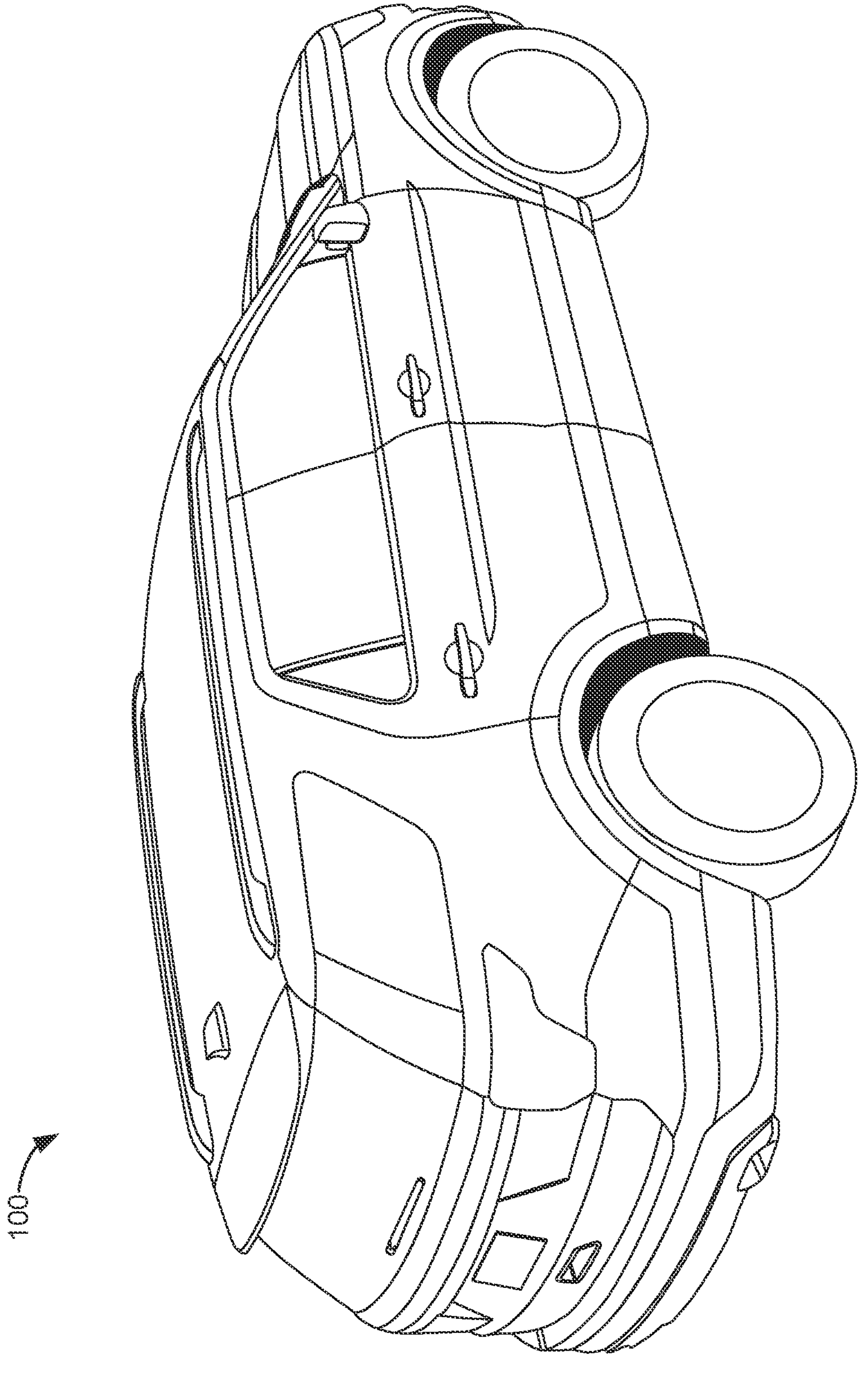
FIG. 1 illustrates an example vehicle in which the example methods and apparatus disclosed herein can be implemented.

Most vehicles include a powered steering system that utilizes a motor, such as hydraulic motor or electric motor, to assistant in applying torque to the steering system, and which reduces the torque input needed by the driver to steer the vehicle. In such vehicles, an electronic control unit utilizes a 'boost curve' to determine an assistance torque to be applied to the motor based on driver torque input to a steering wheel. The boost curve defines a static relationship between the driver applied input torque and the assistance torque that the motor produces on the steerable wheels of the vehicle.

Some newer vehicles also have self-driving capabilities, referred to herein as a self-driving mode, path follower mode, or automated driving mode. When the vehicle is in the self-driving mode, path follower (PF) circuitry (e.g., a PF controller) of the electronic control unit determines a target path for the vehicle and provides a torque request to the motor to automatically control a yaw direction of the vehicle, thereby steering the vehicle along the target path. The PF circuitry receives sensor feedback, such as yaw values, and uses this feedback to further steer the vehicle along the target path. Furthermore, the assistance torque from the boost curve (e.g., based on the input torque from the driver) can be overlayed on the torque request from the PF circuitry. This allows the driver to still provide input and at least partially steer the vehicle while the vehicle is in the self-driving mode. As with power steering, the input torque applied to the steering wheel is equated, by the boost curve, to a larger torque to be applied by the motor. The torque value from the boost curve is combined with the torque from the PF circuitry input to the motor to steer the vehicle.

Recently, to provide stiffer and more robust lateral control, the self-driving vehicle industry has moved toward using a steering angle interface between the PF circuitry and the steering wheel input rather than a torque interface. In these newer systems, the PF circuitry calculates a steering angle to be achieved to cause the vehicle to stay on path, and then converts the steering angle to a torque to be applied by the motor to the steering wheel to achieve the steering angle. As used herein, the terms steering angle and steering wheel angle (SWA) are used interchangeably and mean the angle the steering wheel has been rotated (e.g., by the driver) relative to a neutral or center position. As used herein, the term road wheel angle (RWA) means the angle the steerable wheels, such as the front two wheels, have been rotated (e.g., turned left or right) relative to a neutral or center position. Many of the example operations disclosed herein calculate a steering angle that is used to turn the steering wheel of the vehicle and thereby steer the vehicle. However, in most vehicles, the steering wheel is mechanically connected to the front wheels by a fixed gear relationship (e.g., via a rack and pinion). The geared relationship may implemented as a fixed steering ratio or a variable steering ratio. For example, for every 12-20° the steering wheel is rotated, the front wheels are turned 1°, and vice versa. Therefore, any of the example operations disclosed herein can instead be described as calculating a road wheel angle, because the steering angle can be equated to the road wheel angle, and vice versa.

In some examples, the PF circuitry provides a PF angle request that corresponds to a target steering angle. However, this angle interface between the PF circuitry and the steering gear (e.g., steerable wheel, gear rack, etc.) imposes a difficulty in overlaying the driver input torque on the PF angle request. That is, the assistance torque from the boost curve cannot be easily combined with the PF angle request. Thus, in these angle-based follower platforms, the boost curve is typically deactivated during self-driving mode such that there is no torque overlay between the torque output of the angle control (e.g., PF circuitry) and the boost curve output. This increases robustness of the path follower operation of the vehicle because torque noise from amplification of the input torque is removed. However, this also presents a need for driver input to be overlayed at the angle request level rather than the torque level.

Disclosed herein are example steering controllers and associated methods that use a virtual boost curve (VBC) to determine a steering angle, referred to herein as a VBC angle request, based on the driver torque input. In some examples, the steering controller determines a delta or incremental steering angle based on at least the driver torque input, and adds the delta angle to a current SWA to generate the VBC angle request. The example steering controller combines the VBC angle request with the PF angle request to generate a final steering angle request. Therefore, rather than a torque based boost curve output, the VBC is used to determine or output a steering angle, which is then combined with the PF angle request. An angle controller of the example steering controller converts the final steering angle request to a final torque request, which the motor of the steering system uses to adjust the steering angle of the steering wheel to steer the vehicle along the intended path.

In some examples, the steering controller includes VBC circuitry and/or implements a VBC method to enable manual steering while still being in the self-driving mode. The example steering controller disclosed herein uses the input torque (e.g., torsion bar (T-bar) torque) to generate an incremental angle, adds the incremental angle to the current SWA, and generates a VBC request that gets blended with the PF request and used to generate a final angle request for the angle controller. In some examples, the torque source is the raw T-Bar torque and not a filtered torque, such as a Kalman filter based driver torque. That is, examples disclosed herein use a raw torque input to generate the VBC angle request because the lag associated with filtered torques creates a lag in the steering feel using the VBC. Examples disclosed herein also combine the VBC angle request with the PF angle request to generate the final angle request. In some examples, the VBC angle request and the PF angle request are combined after the VBC angle request is properly tuned.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

FIG. 1 illustrates an example vehicle 100 in which the examples disclosed herein can be implemented. The example vehicle 100 includes an example steering controller, shown in further detail herein, that can operate to automatically steer and/or direct the vehicle along a target path. Such automated operation is referred to herein as a path follower (PF) or self-driving mode or operation. In some examples, the self-driving mode can be activated and deactivated by the driver by pressing or a button and/or interacting with a display in the vehicle. During the self-driving mode, the steering controller of the vehicle 100 generates a PF angle request (e.g., independent of driver input) to direct the vehicle 100 along a target path. If the driver applies a torque input to the steering wheel of the vehicle 100, the steering controller generates a VBC angle request. The steering controller combines the VBC angle request with the PF angle request to generate a final angle request, and converts the final angle request to a torque request or output to be used to adjust the steering angle of the vehicle 100. Further description of the steering controller of the vehicle 100 is provided below in connection with FIGS. 2-18. The illustrated example of the vehicle 100 of FIG. 1 is merely an example of a sport utility vehicle (SUV) in which examples disclosed herein can be implemented. However, examples disclosed herein can also be implemented in connection with other types of vehicles (e.g., pickup trucks, sedans, semi-trucks, etc.).

Figure 2:
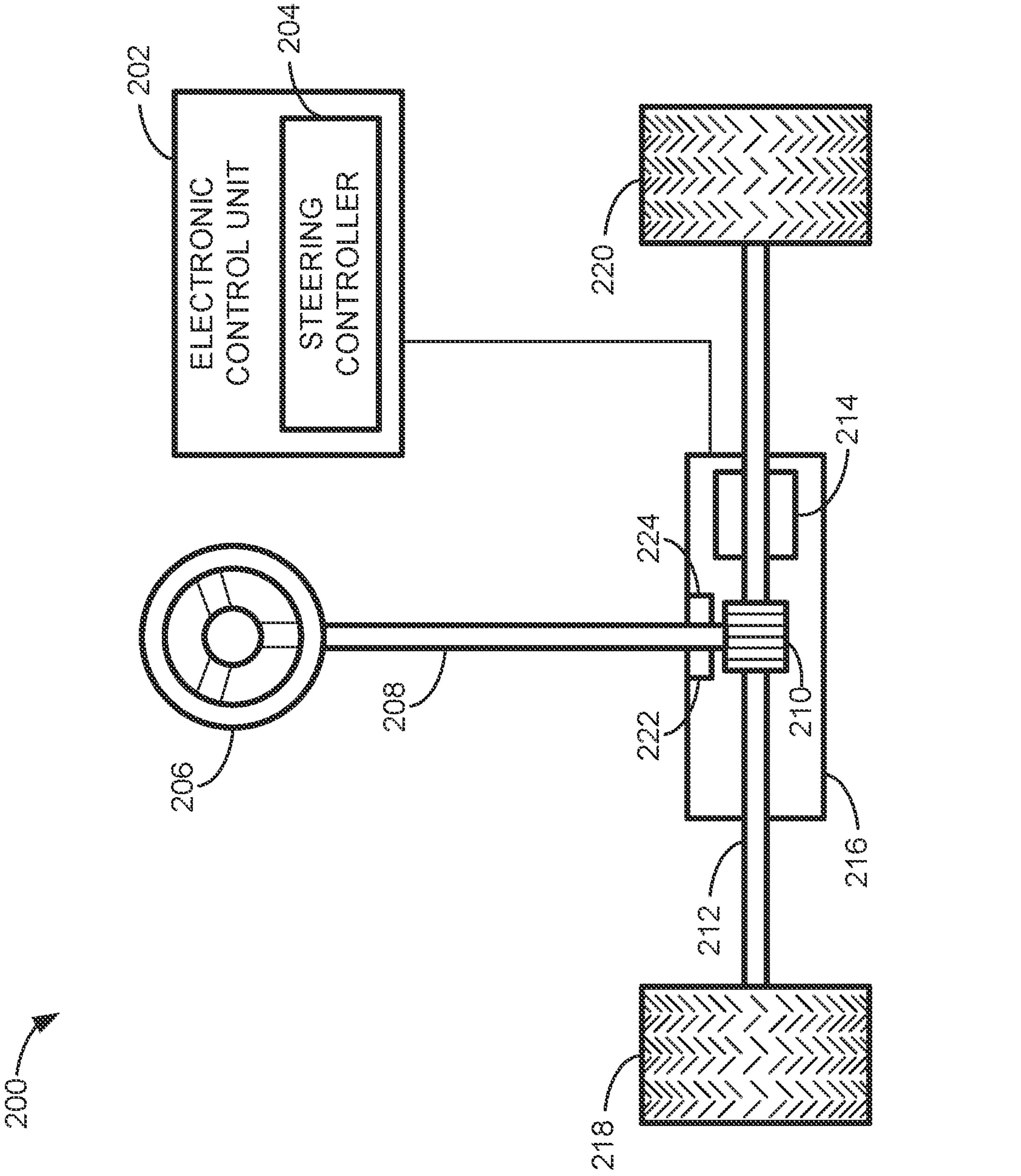
FIG. 2 is a schematic of an example steering system of the example vehicle of FIG. 1 including an example steering controller used to steer the vehicle in a self-driving mode.

FIG. 2 is a schematic illustration of an example steering system 200 that can be implemented in the example vehicle 100 of FIG. 1. In the illustrated example of FIG. 2, the steering system 200 includes an electronic control unit 202 including a steering controller 204, a steering wheel 206, a steering column 208, a pinion 210, a gear rack 212, a steering motor 214, a housing 216, a first steerable wheel 218, a second steerable wheel 220, a torque sensor 222, and an SWA sensor 224. The example steering wheel 206 is mechanically connected to the first steerable wheel 218 and the second steerable wheel 220 (e.g., the front wheels of the vehicle 100 (FIG. 1). In particular, the steering wheel 206 is coupled to the first steerable wheel 218 and the second steerable wheel 220 via the steering column 208, the pinion 210, and the rack 212. Thus, as the driver of the vehicle 100 of FIG. 1 inputs torque to adjust the SWA of the steering wheel 206, the steering angle of the first and second steerable wheels 218, 220 is correspondingly adjusted (e.g., turned left or right). The rack and pinion 212, 210 may implement a fixed gear ratio or a variable gear ratio. In some examples, the steering column is a single shaft extending between the steering wheel 206 and the pinion 210. In other examples, the steering column 208 is a mechanical linkage including two or more interconnected shaft segments. For example, the steering column 208 can include a first steering shaft coupled to a second steering shaft via a universal joint (U-joint). Thus, the steering column 208 can be straight and/or angled between the steering wheel 206 and the steerable wheel 210.

In the illustrated example of FIG. 2, the pinion 210 is coupled to and/or interfaces with the gear rack 212. For example, gear teeth of the pinion 210 are meshed with gear teeth of the gear rack 212. Thus, as the pinion 210 rotates based on the driver input torque to the steering wheel 206, the gear rack 212 translates laterally relative to the steering column 208. In some examples, the pinion 210 is positioned within the housing 216. In some examples, the pinion 210 is positioned outside of the housing 216.

In the illustrated example of FIG. 2, the steering system 200 includes the motor 214. The motor 214 is operatively coupled to the steering wheel 206 and the first and second steerable wheels 218, 220. For example, the motor 214 can be coupled to the gear rack 212. When activated, the motor 214 moves or translates the gear rack 212, which thereby turns or angles the steering wheel 206 as well as the steerable wheels 218, 220. Thus, the motor 214 operates to adjust the steering angle of the steering wheel 206 and, thus, also adjusts the road wheel angle of the first and second steerable wheels 218, 220 to steer the vehicle 100. In some examples, the motor 214 can be used to provide power steering assistance. For example, in a traditional driving mode, based on torque input to the steering wheel 206, the electronic control unit 202 may activate the motor 214 to provide additional torque assistance for steering the vehicle 100. Additionally, the motor 206 can be activated to control the steering angle of the steering wheel 206 while the vehicle 100 is in a self-driving mode. As discussed in further detail herein, the steering controller 204 can provide a PF angle request and/or a torque request to the motor 214 to cause the motor 214 to adjust the steering angle accordingly.

The example steering controller 204 can operate in a self-driving mode to control the motor 214 and adjust the steering angle of the vehicle 100, example operations of which are disclosed in further detail herein. The steering controller 204 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the steering controller 204 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In some examples, the steering controller 204 of FIG. 2 includes instructions and programmable circuitry to execute the instructions to generate a virtual boost curve (VBC) angle request based on a torque input to a steering wheel 206 of the example vehicle 100 of FIG. 1. Furthermore, the steering controller 204 determines an angle blend weight based on the torque input and a speed of the vehicle 100. The example steering controller 204 can determine a final angle request based on a combination of the VBC angle request, a path follower (PF) angle request, and the angle blend weight. The example steering controller 204 converts the final angle request to a torque request to be used to adjust the steering angle of the vehicle 100. Further descriptions regarding the structure and operations of the steering controller 204 are described below in connection with FIGS. 3-18.

In the illustrated example of FIG. 2, the steering system 200 includes the torque sensor 222 to detect or measure an input torque on the steering wheel 206. For example, when the driver turns or attempts to turn the steering wheel 206 during self-driving mode of the vehicle 100 of FIG. 1, the torque sensor 222 detects the torque input. In some instances, when in the self-driving mode, the torque applied by the motor 214 is quite powerful. As such, the driver may not be able to physically turn the steering wheel 206. However, the torque sensor 222 can still detect a torque applied at the steering wheel 206, which can then be converted into a desired steering angle, disclosed in further detail herein. In some examples, the steering controller 204 analyzes the sensor output to determine the torque input by the driver. The example torque sensor 222 can detect a static torque input at a point in time and/or a dynamic torque input over a period of time. As such, the torque sensor 222 can be a reaction torque sensor including a stationary or non-rotating transducer. The example torque sensor 222 can also be a rotary torque sensor including rotary transducers to measure torque input. In some examples, the torque sensor 222 is coupled to a torsion bar (T-bar) of the steering system 200. The torque on the T-bar can be equated to a torque applied at the steering wheel 206. In other examples, the torque sensor 222 is connected at another location of the steering system 200 (e.g., at the steering wheel 206).

In the illustrated example of FIG. 2, the steering system 200 includes the SWA sensor 224 to detect a SWA of the steering wheel 206, the steering column 208, and/or the pinion 210. The example SWA sensor 224 can be coupled to the steering column 208 and/or the pinion 210 in a contacting or non-contacting arrangement. In some examples, the SWA sensor 224 is implemented as to a rotary position sensor, which enables precise angle measurements of the steering wheel 206. For example, the SWA sensor 224 can transform mechanical rotary positions into electrical signals. Thus, the example SWA sensor 224 can correspond to an incremental encoder or a rotary encoder that detects changes in SWA, angular velocity, and/or direction of rotation of the steering wheel 206. In some examples, the steering controller 204 obtains the SWA from the SWA sensor 224 in the form of a digital signal that the SWA sensor 224 (e.g., mechanical motion sensor) creates from a motion of the steering wheel 206, the steering column 208, and/or the pinion 210.

Figure 3:
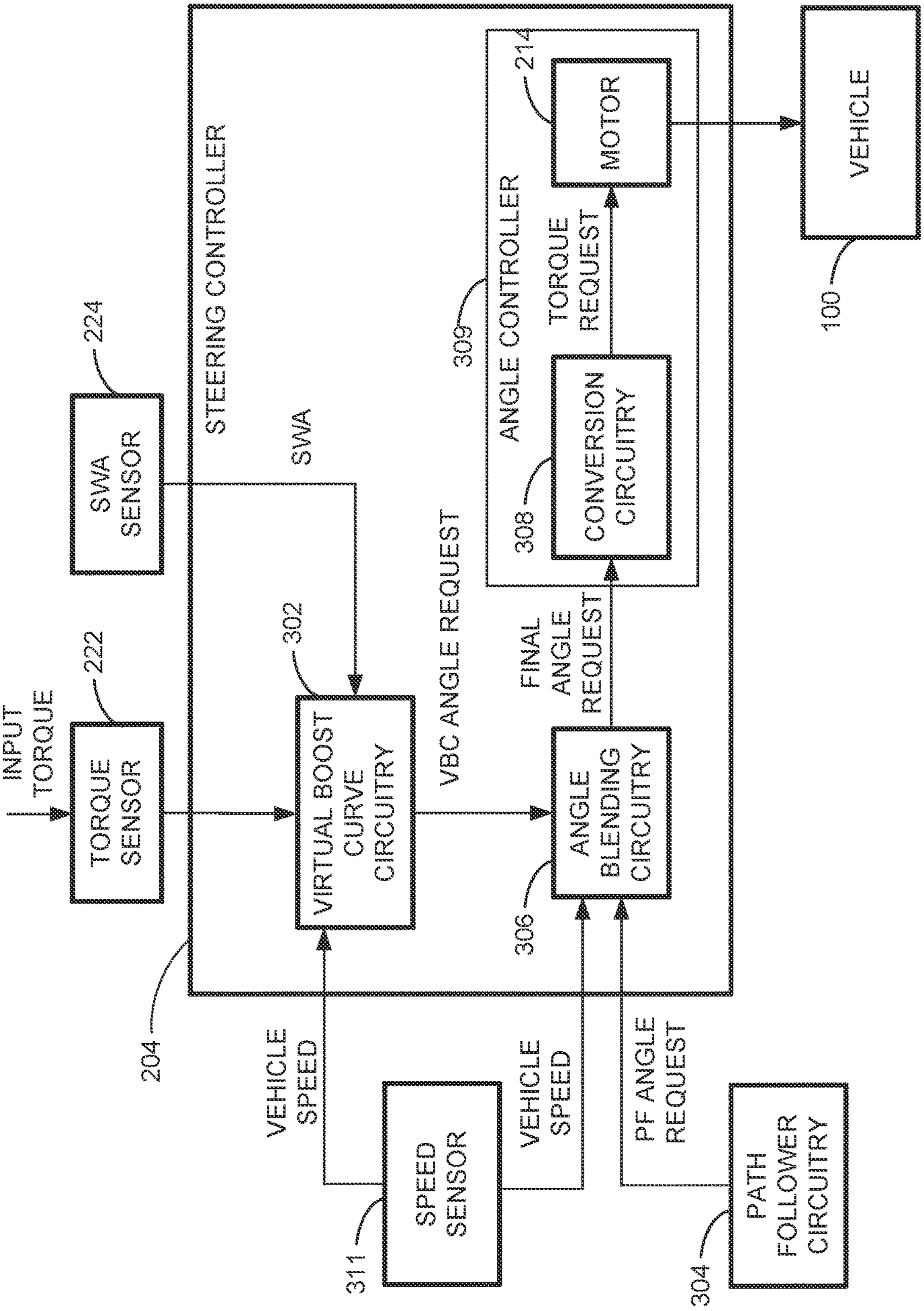
FIG. 3 is a block diagram of the example steering controller of FIG. 2.

FIG. 3 is a block diagram of the steering controller 204 of FIG. 2. When the vehicle 100 is in the self-driving mode, the steering controller 204 operates to control the motor 214 to adjust the steering of the vehicle 100 and thereby steer the vehicle 100 along a target path. The steering controller 204 can also control the motor 214 (and, thus, the steering angle) based on driver input torque during the self-driving mode, such as when the driver attempts to manually turn the steering wheel 206 (FIG. 2). In some examples, the steering controller 204 is implemented in the electronic control unit 202 of FIG. 2. Additionally or alternatively, the steering controller 204 can be implemented in another control system, control unit, and/or computing system of the vehicle 100.

In the illustrated example of FIG. 3, the steering controller 204 includes example virtual boost curve circuitry 302 (VBC circuitry 302), example angle blending circuitry 306, and example conversion circuitry 308. The conversion circuitry 308 and the motor 214 may be referred to as an angle controller 309. As mentioned above, the torque sensor 222 outputs sensor signals corresponding to raw T-bar torque, which is indicative of driver input torque applied to with the steering wheel 206. The VBC circuitry 302 obtains the signals from the torque sensor 222, and determines an input torque using a Kalman filter approach and a model of the steering system 200 of FIG. 2. In other examples, a different type of filter may be used or unfiltered torque may be used. Furthermore, the VBC circuitry obtains a current SWA associated with the steering wheel 206 from the SWA sensor 224. The example VBC circuitry 302 determines a VBC angle request based on the input torque and the SWA. The VBC angle request represents a desired driver steering angle, which is based on the current SWA and driver torque applied to the steering wheel 206. In some examples, the VBC angle request is also based at least partially on vehicle speed, which may be measured by a speed sensor 311 of the vehicle 100. The VBC angle request includes a combination (e.g., summation) of an incremental angle and the current SWA. In some examples, the VBC circuitry 302 is instantiated by programmable circuitry executing VBC instructions and/or configured to perform operations such as those represented by the flowchart(s) of FIGS. 16 and 17. Further details on the VBC circuitry 302 and the VBC angle request are described below in connection with FIGS. 4 and 9-18.

When the vehicle 100 is in the self-driving mode, example path follower (PF) circuitry 304 determines a PF angle request, which is used to adjust the steering angle of the vehicle 100 to steer or direct the vehicle 100 along the target path. In FIG. 3 the PF circuitry 304 is shown as separate from the steering controller 204. For example, the PF circuitry 304 may be implemented by another controller of the ECU 202. However, in other examples, the PF circuitry 304 may be part of the steering controller 204. When the driver of the vehicle 100 does not interact with the steering wheel 206 (e.g., zero input torque) during the self-driving mode, the PF follower circuitry 304 controls the yaw, direction, and/or steering angle of the vehicle 100. For example, when the driver input torque is zero during the self-driving mode, the final angle request may be comprised of only the PF angle request. In some examples, the PF circuitry 304 determines the PF angle request based on a target path of the vehicle 100, a velocity of the vehicle 100, a current steering angle of the steering wheel 206 of FIG. 2, and/or a projected path of the vehicle 100. In some examples, the PF circuitry 302 is instantiated by programmable circuitry executing PF instructions and/or configured to perform operations such as those represented by the flowchart(s) of FIG. 16.

In the illustrated example of FIG. 3, the steering controller 204 includes the angle blending circuitry 306 to determine the final angle request based on a combination of the VBC angle request, the PF angle request, and an angle blending weight. In some examples, the angle blending weight is an internal signal that ranges in value from 0 to 1, where an angle blending weight of 0 corresponds to no driver input or interaction, and an angle blending weight of 1 corresponds to fully engaged driver interaction. Therefore, when the driver is not interacting (e.g., angle blending weight equals 0), angle control of the vehicle 100 is based solely the PF angle request.

To generate the angle blending weight, the angle blending circuitry 306 can pass the driver input torque through a VBC weight lookup table, which provides a VBC weight (e.g., a preliminary weight) of 0 or 1. That is, when the input torque does not satisfy a VBC weight threshold, the preliminary weight is 0, and when the input torque does satisfy the VBC weight threshold, the preliminary weight is 1. Furthermore, the angle blending circuitry 306 multiplies the VBC weight by an output of a velocity based weight lookup table, which corresponds to a velocity based weight. The angle blending circuitry 306 may access the vehicle speed measured by the speed sensor 311. In some examples, the angle blending circuitry 306 inputs the vehicle speed to the velocity based weight lookup table to determine the velocity based weight. As the input vehicle speed increases, the output velocity based weight decreases. In some examples, the value of the angle blending weight and the contribution of VBC angle request is higher at lower speeds and lower at higher speeds. For example, as long as the driver input torque and the VBC weight is sufficiently high (e.g., a value of 1), at lower speeds the velocity based weight is higher, and at higher speeds the velocity based weight is lower. In some examples, the velocity based weight is 0 when the vehicle speed is about a threshold (e.g., 30 miles per hour (mph), 45 mph, 60 mph, etc.). In some examples, the angle blending circuitry 306 is instantiated by programmable circuitry executing angle blending instructions and/or configured to perform operations such as those represented by the flowchart(s) of FIG. 16. Further detailed examples regarding the angle blending circuitry 306 and/or the angle blending weight are discussed in connection with FIGS. 5-8.

In the illustrated example of FIG. 3, the steering controller 204 includes the conversion circuitry 308 to convert the final angle request to a torque request to be used to adjust the steering angle of the vehicle 100. For example, the conversion circuitry 308 can obtain the final angle request from the angle blending circuitry 306 and determine a torque to be applied by the motor 214 to the steering system 200 (e.g., to the gear rack 212, the pinion 210, the steering column 208, etc.) to achieve the steering angle associated with the final angle request. In some examples, the conversion circuitry 308 uses and/or generates a model of the steering system 200 of FIG. 2 to convert the final angle request to the torque request. For example, the conversion circuitry 308 can account for size, geometry, orientation, material, structure, or other features of the steering system 200 to generate and/or implement the model. In some examples, the model used by the conversion circuitry 308 is generated based on the size and power of the motor 214, length and gear teeth spacing of the gear rack 212, diameter of the steering column 208, etc. In some examples, the conversion circuitry 308 is instantiated by programmable circuitry executing conversion instructions and/or configured to perform operations such as those represented by the flowchart(s) of FIG. 16.

Figure 4:
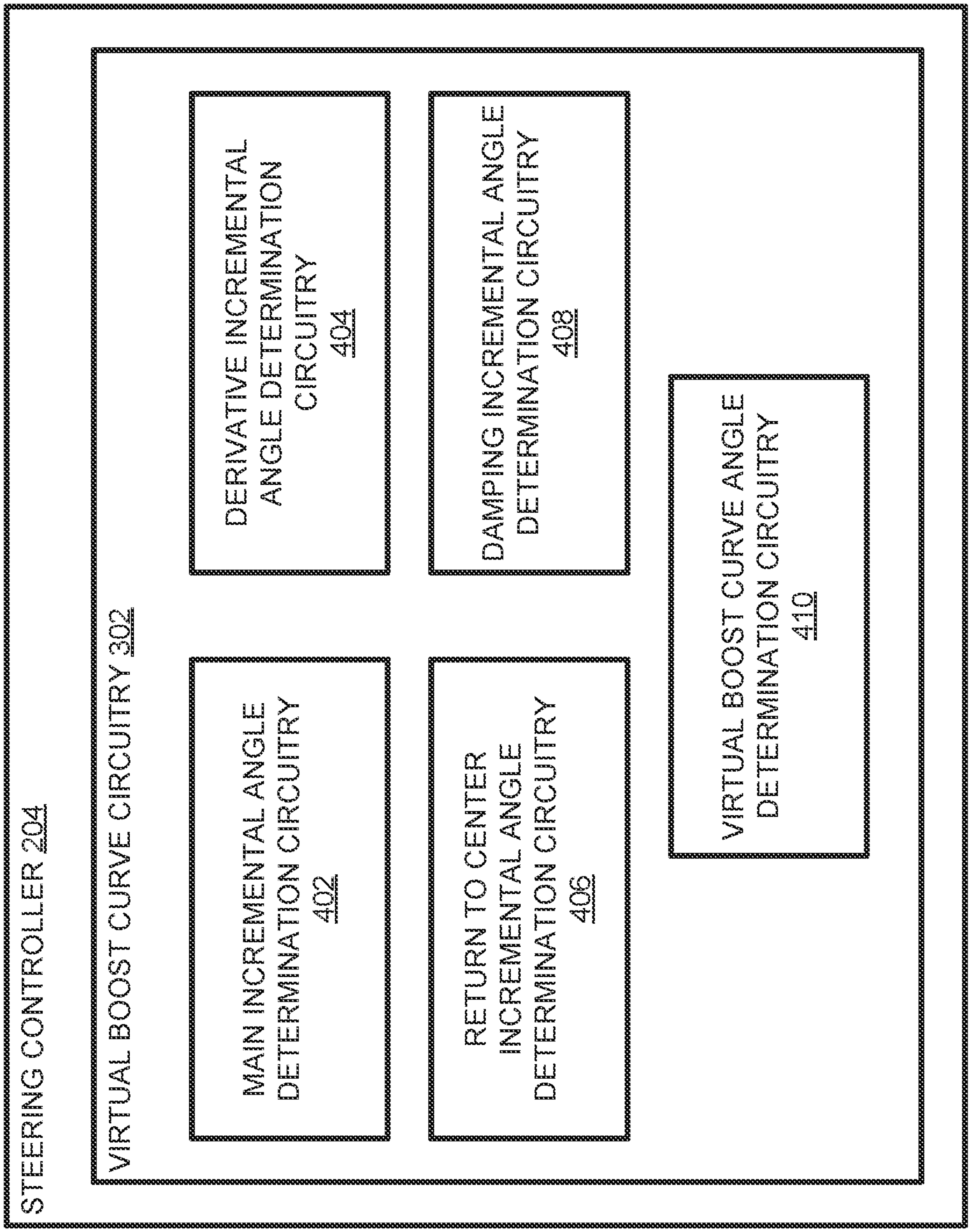
FIG. 4 is a block diagram of an example implementation of virtual boost curve circuitry of the example steering controller of FIG. 3 that is used to generate a virtual boost curve angle request.

FIG. 4 is a block diagram of an example implementation of the VBC circuitry 302 of FIG. 3 to generate the VBC angle request. The VBC circuitry 302 of FIGS. 3 and 4 may be instantiated (e.g., creating an instance of, bring into being for any length of time, materialize, implement, etc.) by programmable circuitry such as a Central Processor Unit (CPU) executing first instructions. Additionally or alternatively, the VBC circuitry 302 of FIGS. 3 and 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times.

Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

In the illustrated example of FIG. 4, the VBC circuitry 302 includes example main incremental angle determination circuitry 402, example derivative incremental angle determination circuitry 404, example return to center incremental angle determination circuitry 406 (R2C incremental angle determination circuitry 406), example damping incremental angle determination circuitry 408, and example VBC angle determination circuitry 410. In some examples, one or more of the main incremental angle determination circuitry 402, the derivative incremental angle determination circuitry 404, the R2C incremental angle determination circuitry 406, the damping incremental angle determination circuitry 408, and/or VBC angle determination circuitry 410 are combined and/or implemented by the steering controller 204 in circuitry distinct from the VBC circuitry 302. The example VBC circuitry 302 of FIGS. 3 and 4 determines multiple incremental angles (e.g., four incremental angles) and adds these incremental angles to the current SWA to generate the final VBC angle request.

In the illustrated example of FIG. 4, the steering controller 204 includes the main incremental angle determination circuitry 402 to determine a main torque based incremental angle for the VBC angle request. The main incremental angle is used as a base value of the VBC angle request. To determine the main incremental angle, the example main incremental angle determination circuitry 402 passes the input torque through a VBC torque to delta SWA lookup table. For example, the main incremental angle circuitry 402 inputs the torque to the lookup table and outputs a delta SWA. In some examples, the main incremental angle determination circuitry 402 implements a virtual wall lookup table to ensure that driver input cannot cause the vehicle 100 of FIG. 1 to move too far off path. Furthermore, in some examples, the main incremental angle determination circuitry 402 implements a velocity based weight lookup table to reduce the value of the main incremental angle as the speed of the vehicle 100 of FIG. 1 increases. In some examples, the main incremental angle determination circuitry 402 is instantiated by programmable circuitry executing main incremental angle determination instructions and/or configured to perform operations such as those represented by the flowchart(s) of FIG. 17. Further details of the main incremental angle determination circuitry 402 are described below in connection with FIG. 10.

In the illustrated example of FIG. 4, the steering controller 204 includes the derivative incremental angle determination circuitry 404 to determine a torque derivative based incremental angle for the VBC angle request. In some examples, the VBC angle determination circuitry 410 adds the derivative incremental angle to the main incremental angle to provide some lead action in moving the steering wheel 206. In other words, the derivative incremental angle determination circuitry 404 determines the derivative incremental angle to increase a response time of the steering controller 204. Thus, the derivative incremental angle circuitry 404 causes the VBC angle request to have greater influence on angle control of the vehicle 100 over the PF angle request. Furthermore, the derivative incremental angle determination circuitry 404 limits the gain of the main incremental angle to increase responsiveness and maintain stability of the steering system 200 of FIG. 2. In some examples, the derivative incremental angle determination circuitry 404 is instantiated by programmable circuitry executing derivative incremental angle determination instructions and/or configured to perform operations such as those represented by the flowchart(s) of FIG. 17. Further details of the main incremental angle determination circuitry 402 are described below in connection with FIGS. 11 and 12.

In the illustrated example of FIG. 4, the steering controller 204 includes the R2C incremental angle determination circuitry 406 to determine a R2C incremental angle for the VBC angle request. In some examples, to return the steering wheel 206 (FIG. 2) back to a reference position (e.g., automated vehicle path), the R2C incremental angle is subtracted from the main incremental angle and the derivative incremental angle to determine the VBC angle request. The example R2C incremental angle determination circuitry 406 generates the R2C incremental angle based on the difference between the current SWA and a R2C reference. As used herein, the R2C reference is a SWA angle that corresponds to the instantaneous path curvature.

Thus, the steering wheel 206 is urged toward the R2C reference (e.g., the instantaneous path or the PF angle request) during self-driving mode. For example, when the driver applies the input torque to the steering wheel 206, the driver feels the resistance that the R2C incremental angle determination circuitry 406 imposes on the steering wheel 206 based on the R2C incremental angle and/or the position of the R2C reference. When driving without automated steering based on angle control, the mechanical components of the steering system 200 (e.g., steerable wheels 218, 220, tires, suspension, etc.) cause the steering wheel 206 to naturally return to a central position. However, because the VBC circuitry 302 is continuously controlling the motor 214 to steer the vehicle 100, the steering system 200 does not naturally return the vehicle 100 to center while in the self-driving mode. Thus, the R2C incremental angle determination circuitry 406 is implemented in the steering controller 204 to return to the steering wheel 206 and the steerable wheels 218, 220 to the center/neutral position.

In examples disclosed herein, the R2C reference is used in place of a central position (e.g., zero SWA) of the steering wheel 206 (FIG. 2). In some examples, the R2C incremental angle determination circuitry 406 determines the R2 reference based on vehicle speed and an understeer gradient. Additionally or alternatively, the R2C reference corresponds to the PF angle request. The VBC angle determination circuitry 410 subtracts the R2C incremental angle from the main incremental angle to determine the final VBC angle request. Thus, the R2C incremental angle determination circuitry 406 determines the R2C incremental angle to provide resistance and/or counteraction to the driver input torque. For example, when the driver input torque is removed from the steering wheel 206 (FIG. 2), the R2C incremental angle still has a non-zero value and causes the motor 214 (FIG. 2) to steer the vehicle 100 (FIG. 1) back on the target path. In some examples, the R2C incremental angle determination circuitry 406 is instantiated by programmable circuitry executing R2C incremental angle determination instructions and/or configured to perform operations such as those represented by the flowchart(s) of FIG. 17. Further details on the R2C incremental angle determination circuitry 406 are described in connection with FIGS. 13 and 14.

In the illustrated example of FIG. 4, the steering controller 204 includes the damping incremental angle determination circuitry 408 to determine a damping incremental angle for the VBC angle request. The damping incremental angle determination circuitry 408 determines the damping incremental angle to provide a natural steering feel to the VBC angle request. As mentioned above in connection with the R2C incremental angle determination circuitry 406, the mechanical components of the steering system 200 (FIG. 2) do not provide feedback (e.g., centering movement) to the driver during self-driving mode. Furthermore, the steering system 200 does not mechanically dampen the steering movement to limit uncontrolled movement and/or oscillation of the steering wheel 206. Thus, the damping incremental angle determination circuitry 408 generates the damping incremental angle to provide negative feedback of the steering wheel velocity (e.g., rate of change of SWA). In other words, while the main incremental angle and the derivative incremental angle cause the steering wheel 206 (FIG. 2) to turn (e.g., based on input torque), the R2C incremental angle and the damping incremental angle cause the steering wheel 206 to "spring" back to PF control.

In some examples, the magnitude of the damping incremental angle is based on vehicle speed such that the higher vehicle speeds result in lower damping incremental angles. Furthermore, in some examples, the magnitude of the damping incremental angle is based on the direction of the SWA. For example, the damping incremental angle is lower when the steering wheel 206 is turned away from center at a certain rate relative to the damping incremental angle when the steering wheel 206 turned toward center at the same rate. In some examples, the damping incremental angle determination circuitry 408 is instantiated by programmable circuitry executing damping incremental angle determination instructions and/or configured to perform operations such as those represented by the flowchart(s) of FIG. 17. Further details regarding the damping incremental angle determination circuitry 408 are described in connection with FIG. 15.

In the illustrated example of FIG. 4, the steering controller 204 includes the VBC angle determination circuitry 410 to determine a final VBC angle request. In some examples, the final VBC angle request is determined based on a combination of the four incremental angles, including (1) the main incremental angle, (2) the derivative incremental angle, (3) the R2C incremental angle, and (4) the damping incremental angle, and the current SWA (or instantaneous SWA). In some examples, the VBC angle determination circuitry 410 obtains the incremental angles (e.g., main, derivative, R2C, damping) from the corresponding circuitry and obtains the current SWA from the SWA sensor 224 (FIG. 2). In some examples, to determine the combination of the incremental angles, the example VBC angle determination circuitry 410 sums the main incremental angle and the derivative incremental angle and subtracts the R2C incremental angle and the damping incremental angle. Then, the combination of incremental angles is added to the current SWA to generate the final VBC angle request.

In some examples, in response to the determination of the final VBC angle request, the VBC angle determination circuitry 410 provides the final VBC angle request to the angle blending circuitry 306 to be combined with the PF angle request and generate the final angle request. Additionally or alternatively, the VBC angle determination circuitry 410 provides the final VBC angle request to the motor 214 and/or another component of the steering system 200 after the determination of the final VBC angle request. In some examples, the VBC angle determination circuitry 410 is instantiated by programmable circuitry executing final VBC angle determination instructions and/or configured to perform operations such as those represented by the flowchart(s) of FIG. 17. Further details regarding the VBC angle determination circuitry 410 are described in connection with FIG. 9.

Figure 5:
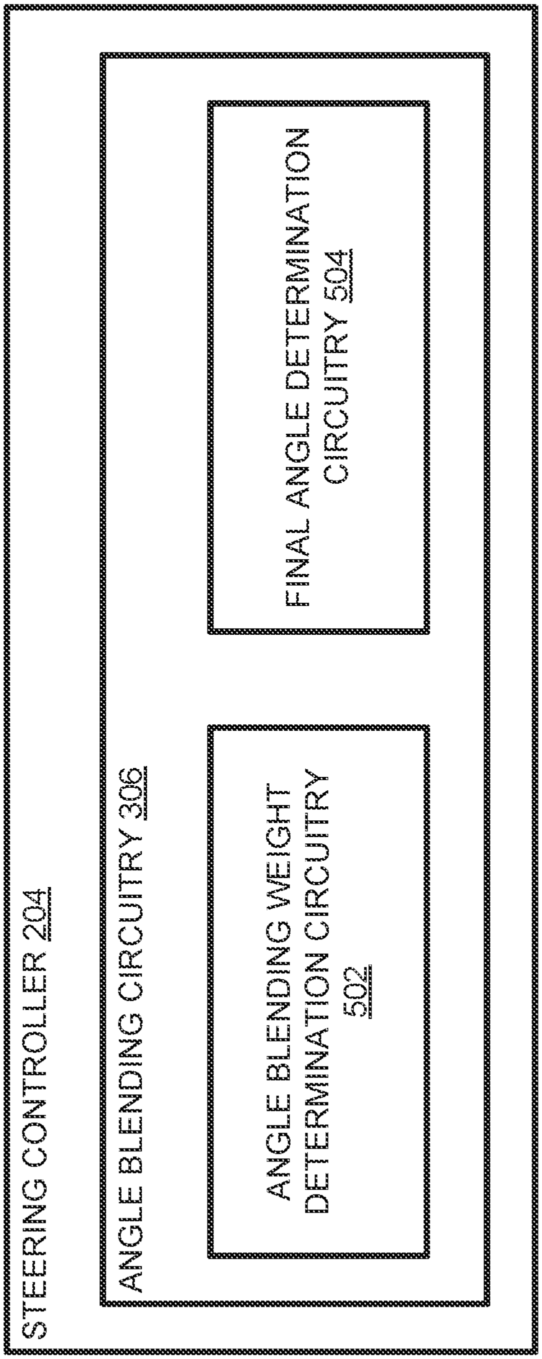
FIG. 5 is a block diagram of an example implementation of angle blending circuitry of the example steering controller of FIG. 3 that is used to generate a final angle request.

FIG. 5 is a block diagram of an example implementation of the angle blending circuitry 306 of FIG. 3 to generate the angle blending weight and to determine the final angle request to be used to generate the torque response of the motor 214 (FIGS. 2 and 3). The angle blending circuitry 306 of FIGS. 3 and 5 may be instantiated (e.g., creating an instance of, bring into being for any length of time, materialize, implement, etc.) by programmable circuitry such as a Central Processor Unit (CPU) executing first instructions. Additionally or alternatively, the angle blending circuitry 306 of FIGS. 3 and 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

In the illustrated example of FIG. 5, the angle blending circuitry 306 includes example angle blending weight determination circuitry 502 and example final angle determination circuitry 504. In some examples, one or more of the angle blending weight determination circuitry 502 and/or the final angle determination circuitry 504 are combined and/or implemented by the steering controller 204 in circuitry distinct from the angle blending circuitry 306. The example angle blending circuitry 306 of FIGS. 3 and 5 determines the angle blending weight based on the driver input torque and the vehicle 100. The example angle blending circuitry 306 applies the angle blending weight to the PF angle request and the VBC angle request to determine the final angle request. Thus, the angle blending circuitry 306 can adjust the influence of the VBC circuitry 302 and the PF circuitry 304 on the automatic angle control during the self-driving mode. For example, the angle blending circuitry 306 can increase the VBC angle request and decrease the PF angle request in the final angle request when the vehicle 100 is at lower speeds and vice versa when the vehicle 100 is at higher speeds.

The final angle request sent to the angle controller (e.g., the conversion circuitry 308 and/or the motor 214 of FIG. 3) is a combination of and/or based on the VBC angle request and the PF angle request. However, if the driver is not interacting with the steering wheel 206, the final angle request solely comprises the PF angle request. In some examples, the angle blending weight represents an amount of driver interaction with the steering wheel 206 and ranges from 0 to 1, where 1 corresponds to fully engaged driver interaction. In some examples, the angle blending weight determination circuitry 502 is instantiated by programmable circuitry executing angle blending weight determination instructions and/or configured to perform operations such as those represented by the flowchart(s) of FIG. 17. In some examples, the final angle determination circuitry 504 is instantiated by programmable circuitry executing final angle determination instructions and/or configured to perform operations such as those represented by the flowchart(s) of FIG. 17.

Figure 6:
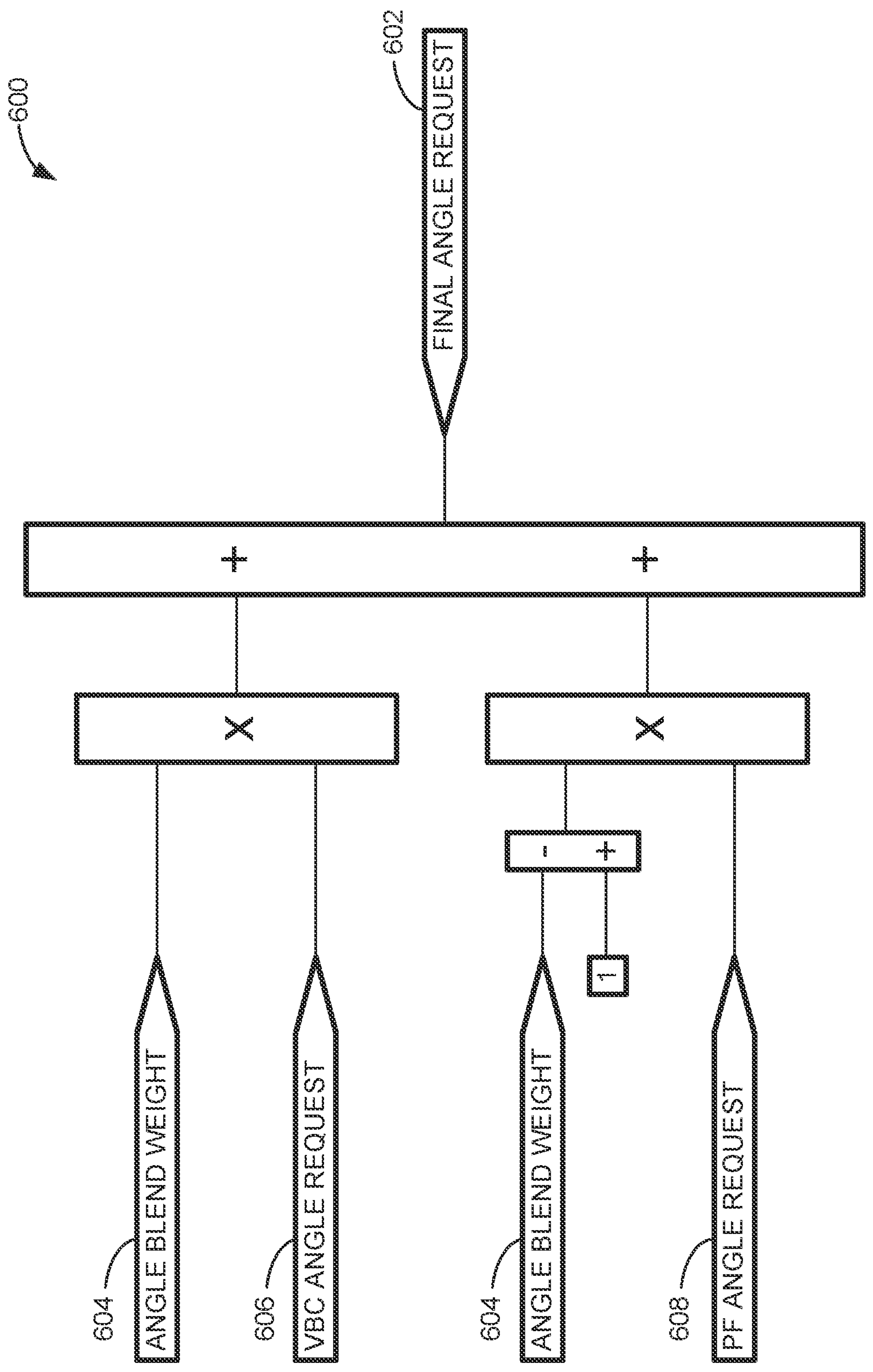
FIG. 6 illustrates an example final angle generation operation for determining an example final angle request.

FIG. 6 illustrates an example final angle generation operation 600 that the example final angle determination circuitry 504 of FIG. 5 performs and/or executes to determine an example final angle request 602. As mentioned, the final angle request 602 is converted to a torque request for the motor 214 (FIGS. 2 and 3) to apply to the steering system 200 (e.g., the gear rack 212, the pinion 210, the steering column 208, etc.) of the vehicle 100 to achieve the final steering angle.

In the illustrated example of FIG. 6, the final angle determination circuitry 504 computes a product of an angle blending weight 604 and a VBC angle request 606. The example angle final angle determination circuitry 504 also subtracts the angle blending weight 604 from one and multiplies the difference by a PF angle request 608. As such, the value of the angle blending weight is between zero and one. The example final angle determination circuitry 504 sums the two products to determine the final angle request 602.

Figure 7:
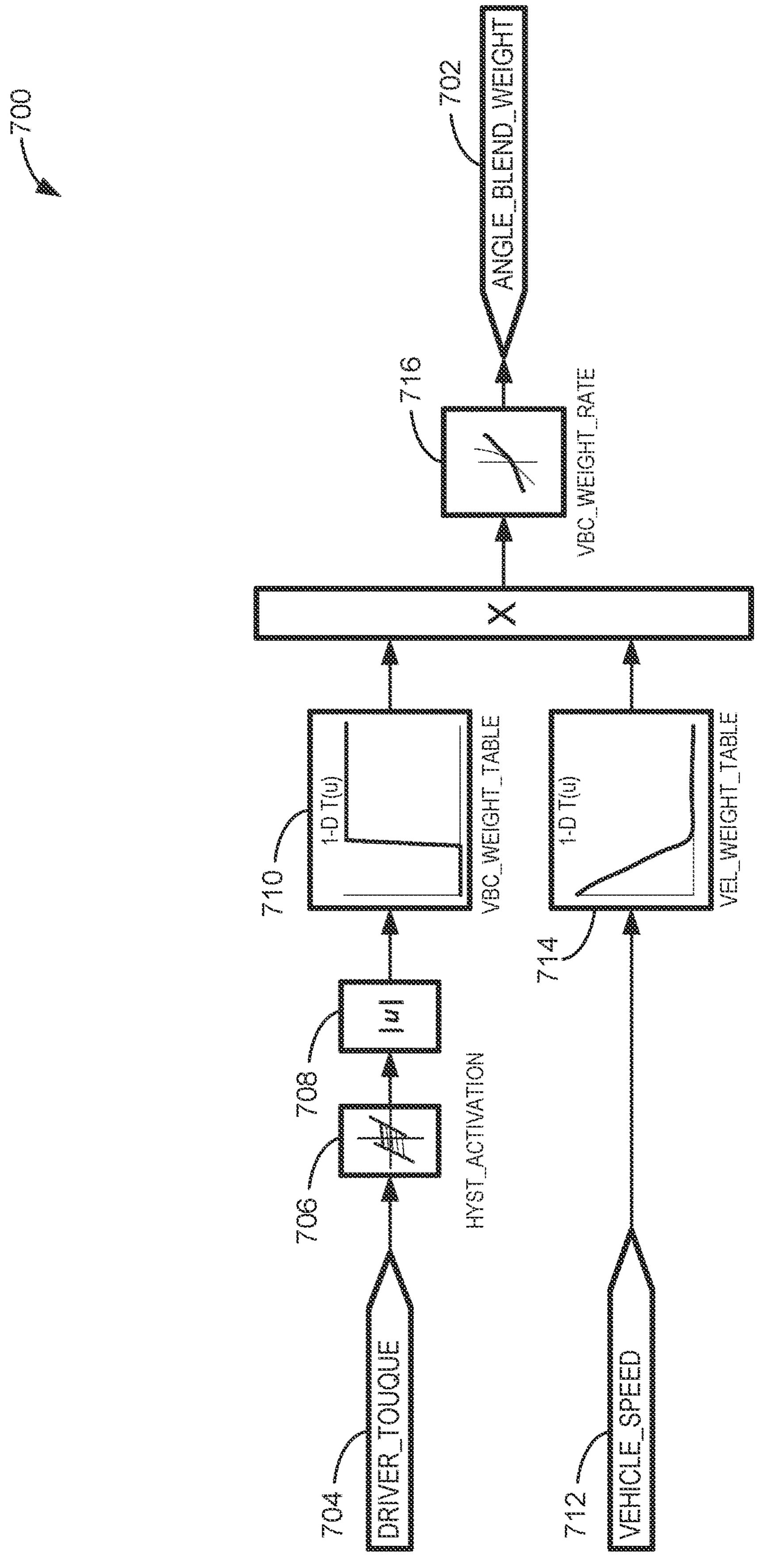
FIG. 7 illustrates an example angle blending weight generation operation for determining an example angle blending weight.

FIG. 7 illustrates an example angle blending weight generation operation 700 that the example angle blending weight determination circuitry 502 of FIG. 5 performs and/or executes to determine an example angle blending weight 702. In some examples, the angle blending weight 702 corresponds to the angle blending weight 604 of FIG. 6. In some examples, the angle blending weight determination circuitry 502 provides the angle blending weight 702 to the final angle determination circuitry 504 (FIG. 5) in response to a request to generate the final angle and/or in response to detected driver input torque via the torque sensor 222 of FIG. 2.

In the illustrated example of FIG. 7, the angle blending weight determination circuitry 502 obtains a driver input torque 704 (e.g., from the torque sensor 222) and performs an example hysteresis operation 706 to introduce some lag in the system. For example, the hysteresis operation 706 can delay the generation of the angle blending weight 702 by a certain length of time (e.g., 10 milliseconds (ms), 50 ms, 100 ms, etc.). The example angle blending weight determination circuitry 502 determines an absolute value 708 of the driver torque 704. In some examples, the angle blending weight determination circuitry 502 inputs the absolute value 708 into an example VBC weight lookup table 710 to determine a VBC weight or preliminary weight. In some examples, the angle blending weight determination circuitry 502 determines whether the driver torque 704 satisfies a VBC weight threshold based on the VBC weight lookup table 710. In some examples, when the driver torque 704 satisfies (e.g., exceeds) the VBC weight threshold, the preliminary weight is one. In some examples, when the driver torque 704 satisfies the VBC weight threshold, the preliminary weight is a value less than one. In some examples, the preliminary weight is set to 0.85. However, in other examples the preliminary weight can be set to a higher or lower value.

In the illustrated example of FIG. 7, the angle blending weight determination circuitry 502 obtains a vehicle speed 712 that corresponds to a current or instantaneous speed of the vehicle 100 (FIG. 1). In some examples, the vehicle speed 712 is measured and/or detected using a vehicle speed sensor (VSS) that measures transmission/transaxle output or wheel speed. The angle blending weight determination circuitry 502 inputs the vehicle speed 712 into an example velocity based weight lookup table 714 to determine a velocity based weight. In some examples, the velocity based weight ranges between a maximum value and a minimum value, which may be between 0 and 1. For example, in some instances, the maximum value is 0.95 and the minimum value is 0.85. Therefore, as the vehicle speed 712 increases, the velocity based weight gradually reduces from 0.95 to 0.85. In some examples, when the vehicle speed 712 satisfies a vehicle speed threshold (e.g., 45 mph, 60 mph, etc.), the velocity based weight is set to the minimum (e.g., 0.85). In other examples, other range values can be used.

In the illustrated example of FIG. 7, the angle blending weight determination circuitry 502 multiplies the VBC weight and the velocity based weight to determine the angle blending weight 702. The example angle blending weight determination circuitry 502 also implements an example rate limiter 716 to limit and/or control the rate of angle blending weight values are provided to the final angle determination circuitry 504.

Figure 8:
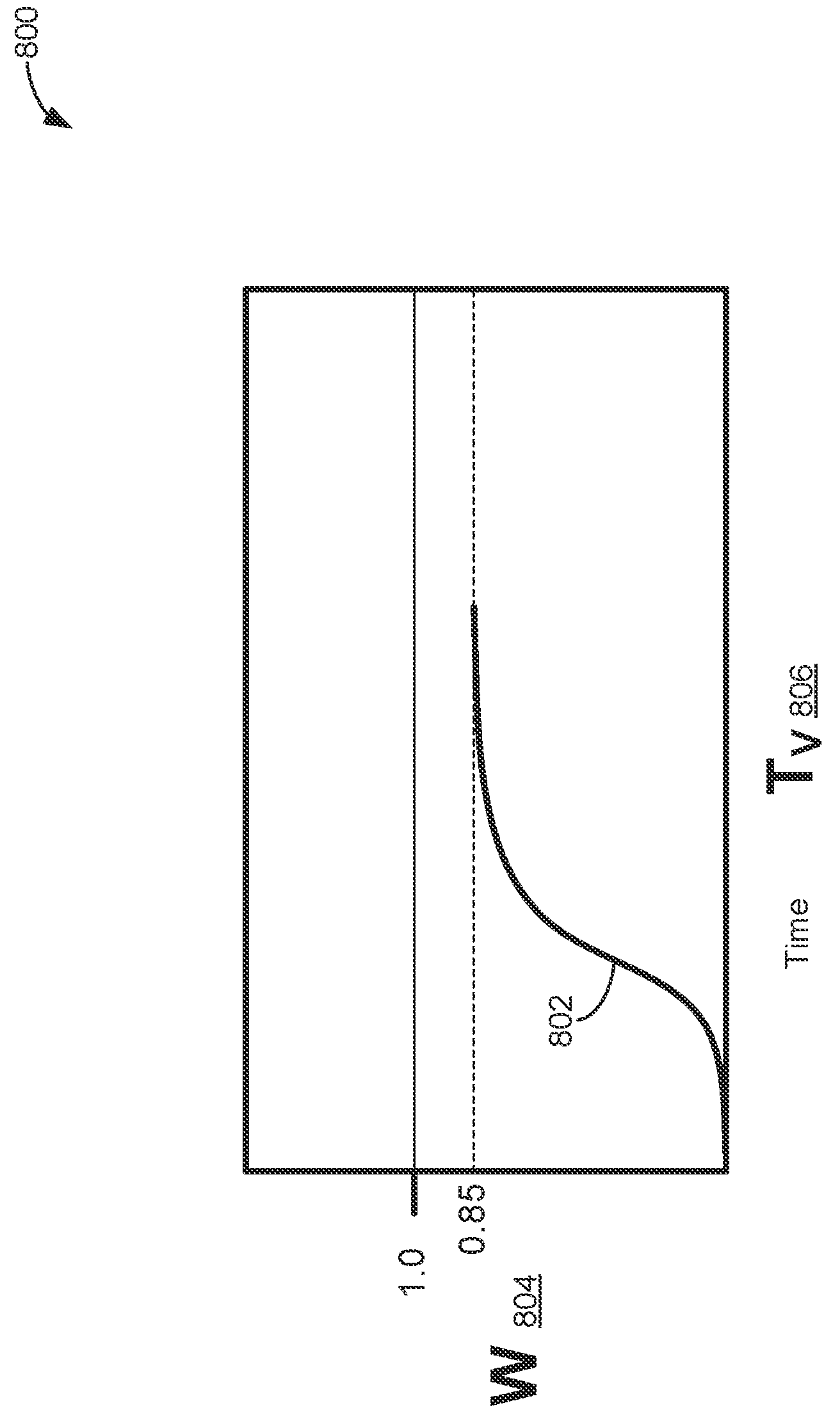
FIG. 8 is an example chart that represents example values of an angle blending weight based on the operation of FIG. 7.

FIG. 8 is an example chart 800 that represents example values of an angle blending weight 802 based on the operations 700 of FIG. 7. In the example chart 800, the y-axis 804 corresponds to the angle blending weight and the x-axis 806 corresponds to the driver input torque. As shown in the example chart 800, as the driver input increases along the x-axis 806, the angle blending weight increases along the y-axis 840. Furthermore, the angle blending weight 802 asymptotically approaches an example weight limit value of 0.85 as the driver torque increases for a given vehicle speed. Thus, because the angle blending weight 802 does not reach a value of one, the final angle request cannot be solely comprised of the VBC angle. In some examples, the weight limit value of the angle blending weight 802 is another value other than 0.85 (e.g., 0.75, 0.90, 0.99, etc.).

Figure 9:
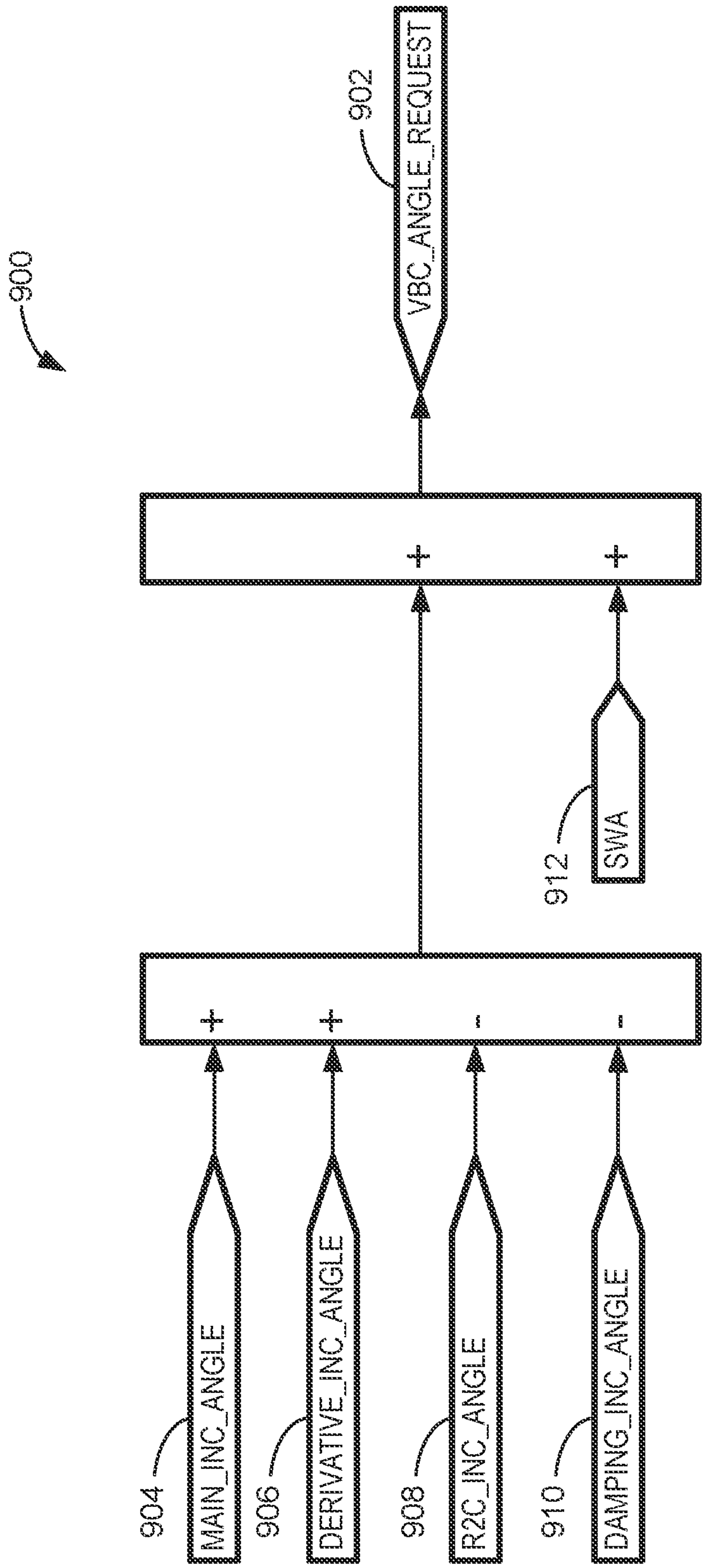
FIG. 9 illustrates an example virtual boost curve angle request generation operation for determining a virtual boost curve angle request.

FIG. 9 is an example VBC angle request generation operation 900 that the VBC angle determination circuitry 410 performs to determine a VBC angle request 902. In some examples, the VBC angle determination circuitry 410 provides the VBC angle request to the angle blending circuitry 306 (e.g., the final angle determination circuitry 504 of FIG. 5) in response to determining the VBC angle request. The example VBC angle determination circuitry 410 obtains an example main incremental angle 904, an example derivative incremental angle 906, an example R2C incremental angle 908, and an example damping incremental angle 910 from corresponding components of the example VBC circuitry 302 of FIGS. 3 and 4. Furthermore, the example VBC angle determination circuitry 410 obtains an example current SWA or instantaneous SWA from the SWA sensor 224 of FIG. 2.

In the illustrated example of FIG. 9, the VBC angle determination circuitry 410 determines a combination of the incremental angles 904-910. More specifically, the example VBC angle determination circuitry 410 sums the main incremental angle 904 and the derivative incremental angle 906 and subtracts the R2C incremental angle 908 and the damping incremental angle 910. The example VBC angle determination circuitry 410 adds the combination of the incremental angles 904-910 to the current SWA 912 to determine the VBC angle request 902.

Figure 10:
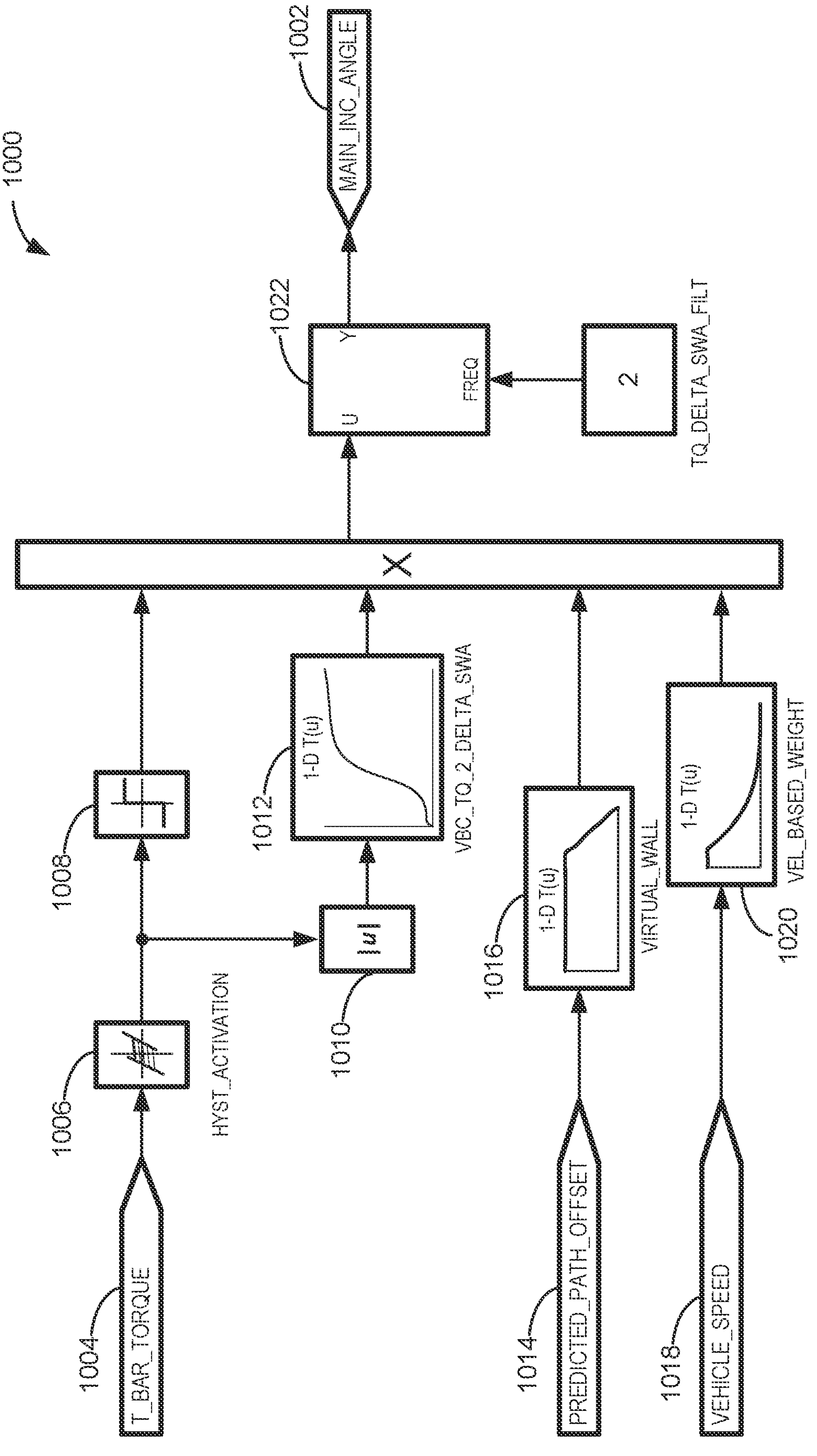
FIG. 10 illustrates an example main incremental angle generation operation for determining an example main incremental angle.

FIG. 10 illustrates an example main incremental angle generation operation 1000 that the main incremental angle determination circuitry 402 performs to determine an example main incremental angle 1002. In some examples, the main incremental angle determination circuitry 402 provides the main incremental angle 1002 to the VBC angle determination circuitry 410 in response to a request from the VBC angle determination circuitry 410. The example main incremental angle 1002 can correspond to the main incremental angle 904 of FIG. 9.

In the illustrated example of FIG. 10, the main incremental angle determination circuitry 402 obtains an example input torque 1004 from the torque sensor 222 of FIG. 2. In some examples, the main incremental angle determination circuitry 402 performs an example hysteresis activation function 1006 on the input torque 1004 to provide some delay in the main incremental angle generation operation 1000. The example incremental angle determination circuitry 402 passes the torque through a sign determiner 1008 to output the sign of the input torque 1004. For example, when the main incremental determination circuitry 402 determines that the driver turned the steering wheel 206 to the right when applying the input work 1004, the sign determiner 1008 outputs a +1. In parallel, the example main incremental angle determination circuitry 402 performs an absolute value function 1010 on the input torque 1004 and inputs the absolute value of the input torque to an example VBC torque to delta SWA lookup table 1012. In some examples, the main incremental angle determination circuitry 402 implements the VBC torque to delta SWA lookup table 1012 to determine delta SWA based on the torque input 1004. In some examples, a different lookup table is used based on the type of vehicle, mechanical components of the steering system 200, etc.

In the illustrated example of FIG. 10, the main incremental angle determination circuitry 402 obtains an example predicted path offset 1014 from the PF circuitry 304 of FIG. 3. In some examples, the predicted path offset 1014 is the difference between the current SWA and the PF angle request generated by the PF circuitry 304. In some examples, the particular path offset is a lateral distance between a current path of the vehicle 100 of FIG. 1 and a target path determined by the PF circuitry 304. The example main incremental angle determination circuitry 402 inputs the predictive path offset 1014 to an example virtual wall lookup table 1016 to determine a virtual wall weight. In some examples, when the predicted path offset 1014 satisfies a virtual wall threshold, the virtual wall weight gradually and or immediately reduces to 0. Thus, when the vehicle 100 moves too far off of the target path (e.g., the predicted path offset 1014 satisfies the virtual wall threshold), the virtual wall weight and the main incremental angle 1002 reduces to 0.

In the illustrated example of FIG. 10, the main incremental angle determination circuitry 402 obtains an example vehicle speed 1018, which can correspond to the example vehicle speed 712 of FIG. 7. The example main incremental angle determination circuitry inputs the vehicle speed 1018 into an example velocity based weight lookup table 1020 to determine a velocity based weight. Similar to the velocity based weight lookup table 714 of FIG. 7, the output of the lookup table 1020 reduces as the vehicle speed 1018 increases. However, the output of the velocity based weight lookup table 1020 reduces at a different rate (e.g., quadratic rate, etc.) than the velocity based lookup table 714 of FIG. 7.

In the illustrated example of FIG. 10, the main incremental angle determination circuitry 402 multiplies the sign of the input torque 1004, the delta WA output from the lookup table 1012, the virtual wall weight output from the lookup table 1016, and the velocity based weight output from the lookup table 1020 to determine a product corresponding to a preliminary main incremental angle. The example main incremental angle determination circuitry 402 inputs the preliminary main incremental angle into an example low pass filter 1022 to limit the frequency of the main incremental angle 1002. For example, the low pass filter 1022 can set a maximum limit of the main incremental angle 1002 such that the VBC angle request is not substantially high. In the illustrated example of FIG. 10, the low pass filter 1022 implements a limit of two Hertz (Hz). However, the example low pass filter 1022 can implement another frequency based on an average value of the VBC angle request.

Figure 11:
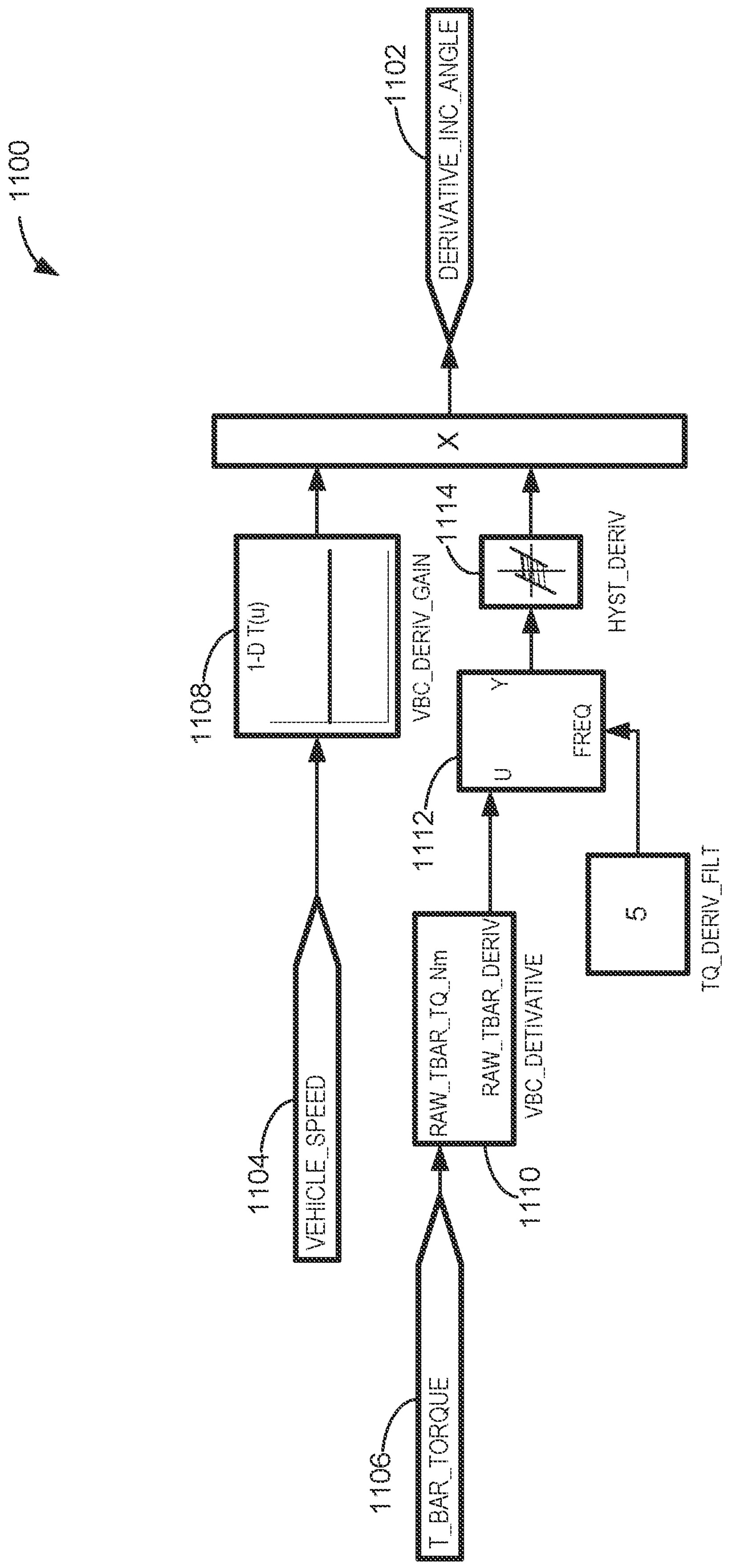
FIG. 11 illustrates an example derivative incremental angle generation operation for determining an example derivative incremental angle.

FIG. 11 illustrates an example derivative incremental angle generation operation 1100 that the derivative incremental angle determination circuitry 404 performs to determine an example derivative incremental angle 1102. In some examples, the derivative incremental angle determination circuitry 404 provides the derivative incremental angle 1102 to the VBC angle determination circuitry 410 in response to a request from the VBC angle determination circuitry 410. The example derivative incremental angle 1102 can correspond to the derivative incremental angle 906 of FIG. 9.

In the illustrated example of FIG. 11, the derivative incremental angle determination circuitry 404 obtains an example vehicle speed 1104 from an example vehicle speed sensor and an example input torque 1106 from the example torque sensor 222 of FIG. 2. The derivative incremental angle determination circuitry 404 inputs the vehicle speed 1104 into a VBC derivative gain function 1108 to determine an example gain value to be applied to a preliminary derivative incremental angle.

To determine the preliminary derivative incremental angle, the derivative incremental angle determination circuitry 404 inputs the input torque 1106 into a VBC derivative function 1110. In some examples the VBC derivative function 1110 inputs the input torque 1106 and outputs a torque derivative. In some examples the VBC derivative function 1110 also includes a lookup table to output a virtual SWA based on the torque input 1106. The example derivative incremental angle determination circuitry 404 then adds the torque derivative to the virtual SWA to determine the preliminary derivative incremental angle. In some examples, the derivative incremental angle determination circuitry 404 inputs the preliminary derivative incremental angle into an example low pass filter 1112 to limit the frequency of the derivative incremental angle. Furthermore, the derivative incremental angle determination circuitry 404 inputs the filtered preliminary derivative incremental angle into an example hysteresis function 1114 to apply a delay to the example operation 1100. In some examples, the product of the gain value and the preliminary derivative incremental angle corresponds to the derivative incremental angle 1102.

Figure 12:
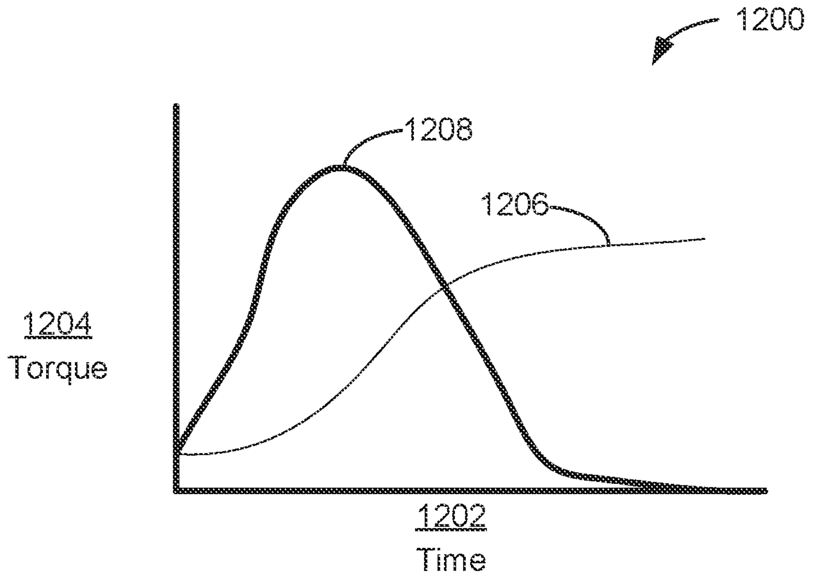
FIG. 12 is an example first derivative incremental angle chart representative of the example derivative incremental angle generation operation of FIG. 11.

FIG. 12 is an example first derivative incremental angle chart 1200 representative of the example derivative incremental angle generation operation 1100 of FIG. 11. In the illustrated examples of FIG. 12, the x-axis 1202 corresponds to time and the y-axis 1204 corresponds to torque. In the chart 1200, a first curve 1206 represents torque input, and a second curve 1208 represents the derivative of the first curve 1206.

Figure 13:
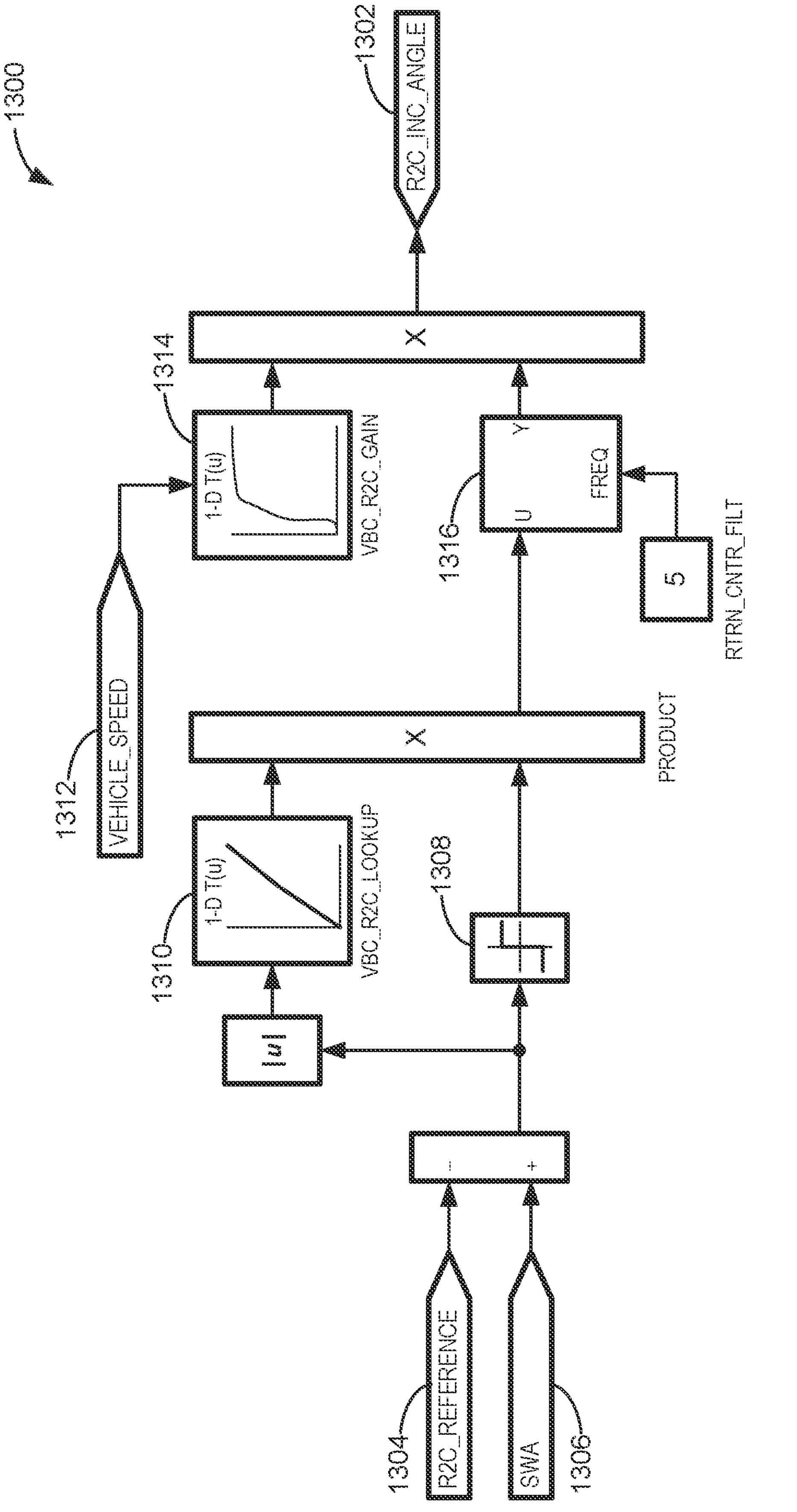
FIG. 13 illustrates an example return to center incremental angle generation operation for determining an example return to center incremental angle.

FIG. 13 illustrates an example R2C incremental angle generation operation 1300 that the R2C incremental angle determination circuitry 406 performs to determine an example R2C incremental angle 1302. In some examples, the R2C incremental angle determination circuitry 406 provides the R2C incremental angle 1302 to the VBC angle determination circuitry 410 in response to a request from the VBC angle determination circuitry 410. The example R2C incremental angle 1302 can correspond to the R2C incremental angle 908 of FIG. 9.

In the illustrated example of FIG. 13, the R2C incremental angle determination circuitry 406 obtains an example R2C reference 1304 and an example current SWA 1306. In some examples, the R2C incremental angle determination circuitry 406 generates the R2C reference 1304. In some examples the R2C incremental angle determination circuitry 406 obtains the R2C reference 1304 from other circuitry hardware (e.g., the PF circuitry 304, the VBC circuitry 302, etc.). The example R2C incremental angle determination circuitry 406 subtracts the R2C reference 1304 from the current SWA 1306 to determinate a preliminary R2C incremental angle. In some examples the R2C incremental angle determination circuitry 406 implements a sign determiner 1308 to output a value of positive one or a negative one based on the R2C reference 1304 relative to the current SWA 1306. For example, the sign determiner 1308 outputs a value of negative one if the current SWA 1306 is to the left of the R2C reference 1304, and vice versa.

In the illustrated example of FIG. 13, the R2C incremental angle determination circuitry 406 inputs the absolute value of the difference between the current SWA 1306 and the R2C reference 1304 into an example VBC to R2C lookup table 1310. The example R2C incremental angle determination circuitry 406 multiplies the output of the lookup table 1310 by the output of the sign determiner 1308 to determine a preliminary R2C incremental angle. Furthermore, the example R2C incremental angle determinations circuitry 406 obtains an example vehicle speed 1312. In some examples, the R2C incremental angle determination circuitry 406 inputs the vehicle speed 1312 into an example VBC R2C gain lookup table 1314 to determine a gain factor. In some examples, the R2C incremental angle determination circuitry 406 passes the preliminary R2C incremental angle through an example low pass filter 1316. The example R2C incremental angle determination circuitry 406 then multiplies the filtered preliminary R2C incremental angle by the gain factor to determine the R2C incremental angle 1302.

Figure 14:
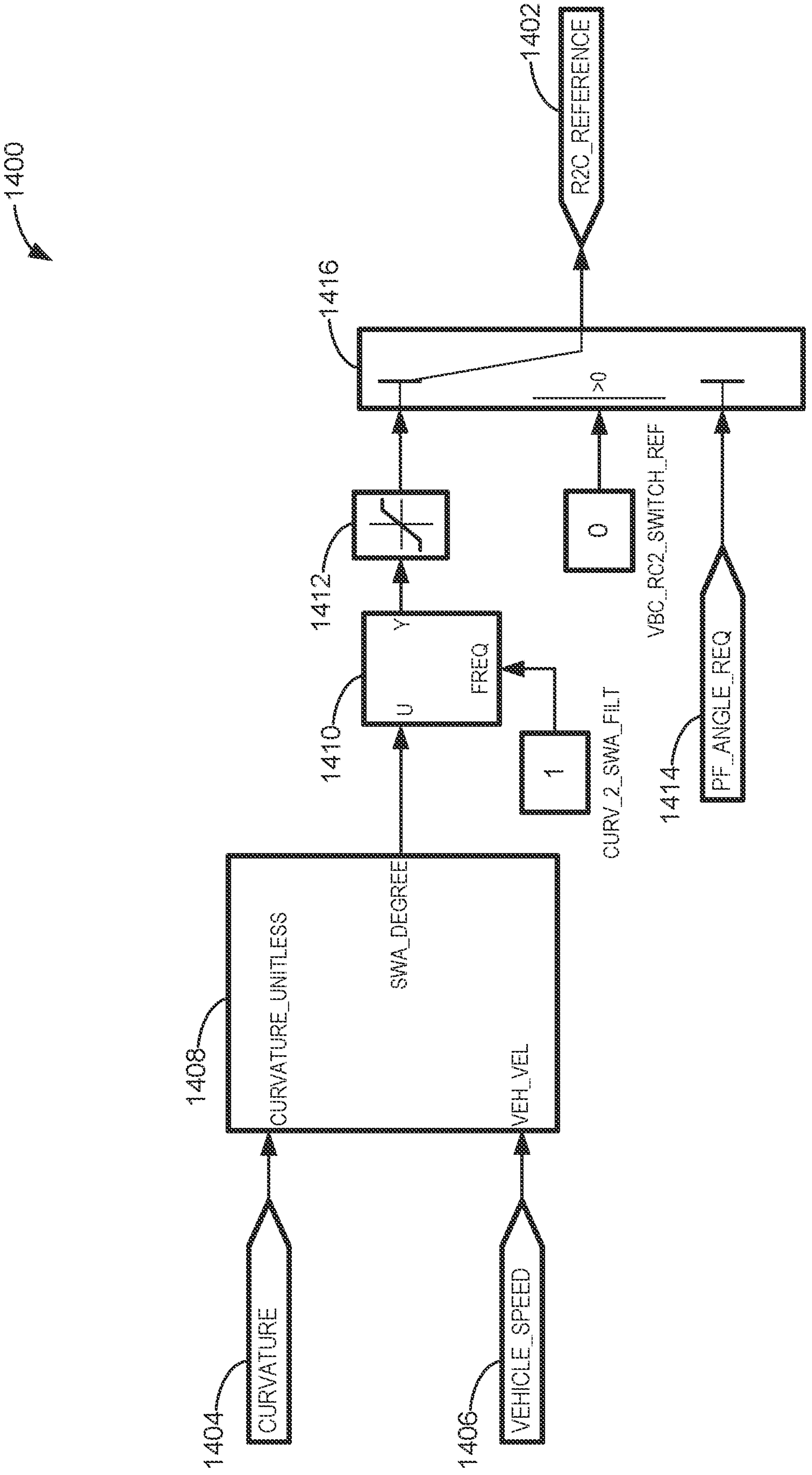
FIG. 14 illustrates an example return to center reference generation operation for determining an example return to center reference.

FIG. 14 is an example R2C reference generation operation 1400 that the R2C incremental angle determination circuitry 406 performs to determine an example R2C reference 1402. In some examples, the R2C reference 1402 corresponds to the R2C reference 1304 of FIG. 13. In the illustrated example of FIG. 14, the R2C incremental angle determination circuitry 406 obtains an example curvature 1404 of the current vehicle path from the example PF circuitry 304 of FIG. 3. Furthermore, the example R2C incremental angle determination circuitry 406 obtains an example vehicle speed 1406 from another sensor of the vehicle 100, such as a vehicle speed sensor. In the illustrated example of FIG. 14, the R2C incremental angle determination circuitry 406 inputs the curvature 1404 and the vehicle speed 1406 into an example SWA determination function 1408.

In some examples, the R2C incremental angle determination circuitry 406 implements the SWA determination function 1408 determine a preliminary R2C reference based on the curvature 1404 and the vehicle speed 1406. The preliminary R2C reference is passed through an example low pass filter 1410 and an example rate limiter 1412. The example R2C incremental angle determination circuitry 406 can also obtain an example PF angle request 1414 from the PF circuitry 304 of FIG. 3. In some examples, the R2C incremental angle determination circuitry 406 implements a switching operation 1416 to switch between the preliminary R2C reference and the PF angle request 1414. In some examples, the switching operation 1416 is used to switch between the preliminary R2C reference and the PF angle request 1414 based on whether an error between the preliminary R2C reference and the PF angle request 1414 exceeds a threshold error. For example, when the difference between the preliminary R2C and the PF angle request 1414 is greater than zero, the switching operation 1416 switches to the preliminary R2C reference. Otherwise, the switching operation 1416 switches to the PF angle request 1414.

Figure 15:
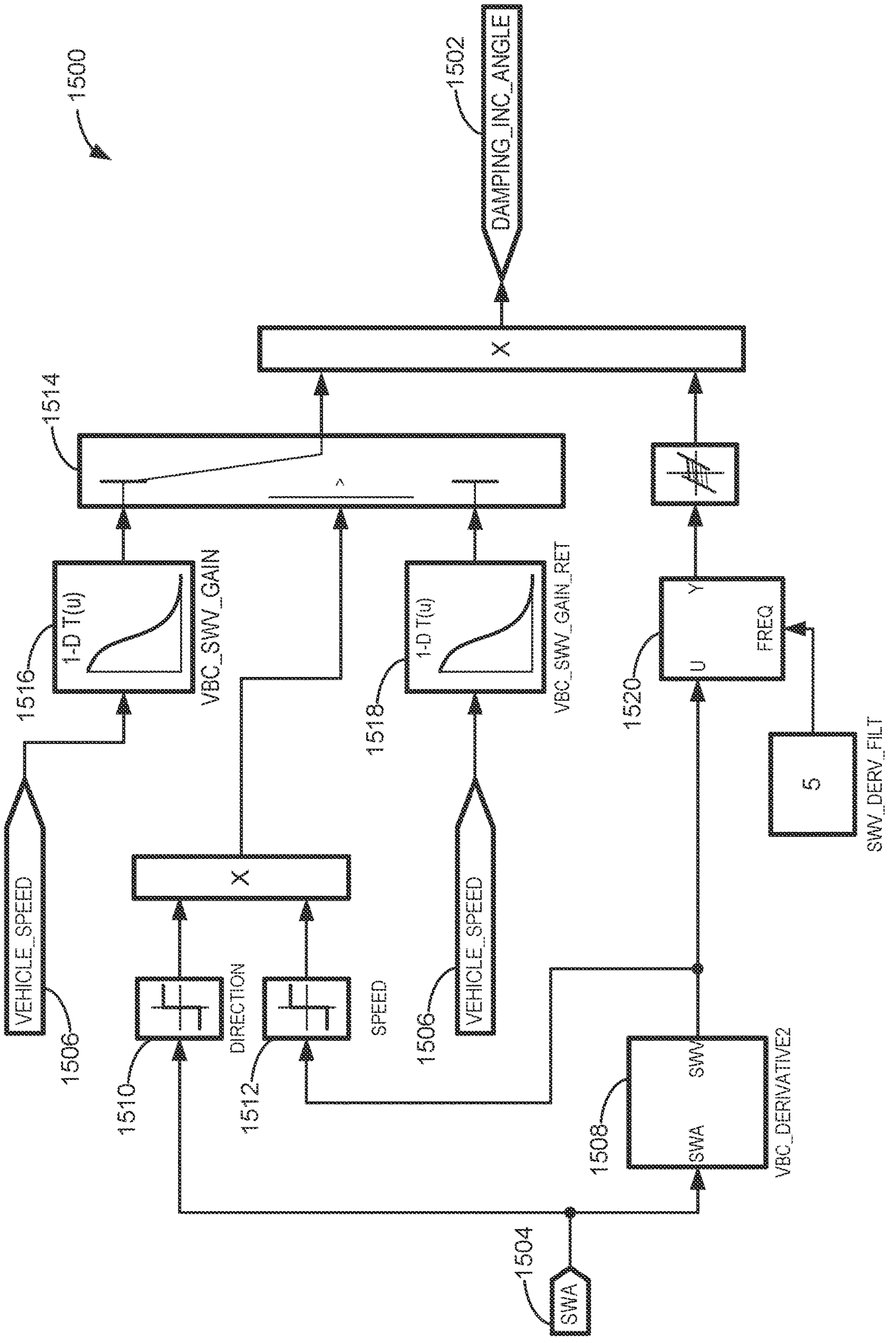
FIG. 15 illustrates an example damping incremental angle generation operation for determining an example damping incremental angle.

FIG. 15 is an example damping incremental angle generation operation 1500 that the damping incremental angle determination circuitry 408 performs to determine an example damping incremental angle 1502. In some examples, the damping incremental angle 1502 corresponds to the damping incremental angle 910 of FIG. 9. In the illustrated example of FIG. 15, the damping incremental angle determination circuitry 408 obtains an example current SWA 1504 from the example SWA sensor 224 of FIG. 2. Furthermore, the example damping incremental angle determination circuitry 408 obtains an example vehicle speed 1506 from another sensor of the vehicle 100, such as a vehicle speed sensor.

In the illustrated example of FIG. 15, the damping incremental angle determination circuitry 408 inputs the current SWA 1504 into an example VBC derivative function 1508 to determine a steering wheel velocity (SWV). In some examples, the damping incremental angle determination circuitry 408 obtains multiple SWA measurements over a period of time to determine the SWV. The example damping incremental angle determination circuitry 408 inputs the SWA 1504 into a first sign determination function 1510 and inputs the SWV into a second sign determination function 1512. The damping incremental angle determination circuitry 408 uses the first sign determination function 1510 to output a positive one or a negative one based on the position of the SWA 1504 relative to the R2C reference. For example, when the steering wheel 206 (FIG. 2) is turned to the right of the R2C reference, the first sign determination function 1510 outputs a positive one. Alternatively, when the steering wheel 206 (FIG. 2) is turned to the left of the R2C reference, the first sign determination function 1510 outputs a negative one. Furthermore, the damping incremental angle determination circuitry 408 uses the second sign determination function 1512 to output a positive one or a negative one based on the direction of the SWV relative to the R2C reference. For example, when the steering wheel 206 (FIG. 2) is being turned to the right, the first sign determination function 1510 outputs a positive one. Alternatively, when the steering wheel 206 (FIG. 2) is being turned to the left, the first sign determination function 1510 outputs a negative one. The example damping incremental angle determination circuitry 408 determines a product of the two outputs to obtain a positive or negative one based on how the steering wheel 206 is being turned relative to the R2C reference. Thus, when the steering wheel 206 is moving toward the R2C reference, the product is a negative one. Alternatively, when the steering wheel 206 is moving away from the R2C reference, the product is a positive one.

In the illustrated example of FIG. 15, the damping incremental angle determination circuitry 408 implements a switching function 1514 to switch between an SWV departure gain lookup table 1516 and an SWV return gain lookup table 1518. When the example damping incremental angle determination circuitry 408 determines the steering wheel 206 is being turned away from center (e.g., product of 1510 and 1512 is positive one), the switching function 1514 causes the damping incremental angle determination circuitry 408 to use the SWV departure gain lookup table 1516. Alternatively, when the example damping incremental angle determination circuitry 408 determines the steering wheel 206 is being turned toward center (e.g., product of 1510 and 1512 is negative one), the switching function 1514 causes the damping incremental angle determination circuitry 408 to use the SWV return gain lookup table 1518. In some examples, the model and/or properties of the SWV departure gain lookup table 1516 and the SWV return gain lookup table 1518 are different. For example, the gain output of the SWV return gain lookup table 1518 for a given value of the vehicle speed 1506 is greater than the gain output of the SWV departure gain lookup table 1516. In some examples, the gain output from the SWV departure gain lookup table 1516 or the SWV return gain lookup table 1518 is a unitless value or coefficient.

In the illustrated example of FIG. 15, the damping incremental angle determination circuitry 408 implements a low pass filter 1520 to limit and/or control a frequency of computations of the damping incremental angle 1502. The outputs of the switching function 1514 and the low pass filter 1520 are multiplied. In some examples, the damping incremental angle determination circuitry 408 also multiplies the product by the time period over which the SWA 1504 was measured to determine the damping incremental angle 1502.

In some examples, the steering controller 204 includes means for generating a virtual boost curve (VBC) angle request. For example, the means for generating the VBC angle request may be implemented by VBC circuitry 302. In some examples, the VBC circuitry 302 may be instantiated by programmable circuitry such as the example programmable circuitry 1812 of FIG. 18. For instance, the VBC circuitry 302 may be instantiated by executing machine executable instructions such as those implemented by at least blocks 1606 and 1608 of FIG. 16. Additionally or alternatively, the VBC circuitry 302 may be instantiated by any other combination of hardware, software, and/or firmware. For example, the VBC circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for generating the VBC angle request includes means for determining a main incremental angle. For example, the means for determining the main incremental angle may be implemented by main incremental angle determination circuitry 402. In some examples, the main incremental angle determination circuitry 402 may be instantiated by programmable circuitry such as the example programmable circuitry 1812 of FIG. 18. For instance, the main incremental angle determination circuitry 402 may be instantiated by executing machine executable instructions such as those implemented by at least block 1702 of FIG. 17. Additionally or alternatively, the main incremental angle determination circuitry 402 may be instantiated by any other combination of hardware, software, and/or firmware. For example, the main incremental angle determination circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for generating the VBC angle request includes means for determining a derivative incremental angle. For example, the means for determining the derivative incremental angle may be implemented by derivative incremental angle determination circuitry 404. In some examples, the derivative incremental angle determination circuitry 404 may be instantiated by programmable circuitry such as the example programmable circuitry 1812 of FIG. 18. For instance, the derivative incremental angle determination circuitry 404 may be instantiated by executing machine executable instructions such as those implemented by at least block 1704 of FIG. 17. Additionally or alternatively, the derivative incremental angle determination circuitry 404 may be instantiated by any other combination of hardware, software, and/or firmware. For example, the derivative incremental angle determination circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for generating the VBC angle request includes means for determining a return to center (R2C) incremental angle. For example, the means for determining the R2C incremental angle may be implemented by R2C incremental angle determination circuitry 406. In some examples, the R2C incremental angle determination circuitry 406 may be instantiated by programmable circuitry such as the example programmable circuitry 1812 of FIG. 18. For instance, the R2C incremental angle determination circuitry 406 may be instantiated by executing machine executable instructions such as those implemented by at least blocks 1706, 1708 of FIG. 17. Additionally or alternatively, the R2C incremental angle determination circuitry 406 may be instantiated by any other combination of hardware, software, and/or firmware. For example, the R2C incremental angle determination circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for generating the VBC angle request includes means for determining a damping incremental angle. For example, the means for determining the damping incremental angle may be implemented by damping incremental angle determination circuitry 408. In some examples, the damping incremental angle determination circuitry 408 may be instantiated by programmable circuitry such as the example programmable circuitry 1812 of FIG. 18. For instance, the damping incremental angle determination circuitry 408 may be instantiated by executing machine executable instructions such as those implemented by at least block 1710 of FIG. 17. Additionally or alternatively, the damping incremental angle determination circuitry 408 may be instantiated by any other combination of hardware, software, and/or firmware. For example, the damping incremental angle determination circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for generating the VBC angle request includes means for combining the main incremental angle, the derivative incremental angle, the R2C incremental angle, the damping incremental angle, and a current steering wheel angle (SWA). For example, the means for combining may be implemented by VBC angle determination circuitry 410. In some examples, the VBC angle determination circuitry 410 may be instantiated by programmable circuitry such as the example programmable circuitry 1812 of FIG. 18. For instance, the VBC angle determination circuitry 410 may be instantiated by executing machine executable instructions such as those implemented by at least blocks 1712, 1714 of FIG. 17. Additionally or alternatively, the VBC angle determination circuitry 410 may be instantiated by any other combination of hardware, software, and/or firmware. For example, the VBC angle determination circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the steering controller 204 includes means for determining an angle blending weight. For example, the means for determining the angle blending weight may be implemented by angle blending weight determination circuitry 502. In some examples, the angle blending weight determination circuitry 502 may be instantiated by programmable circuitry such as the example programmable circuitry 1812 of FIG. 18. For instance, the angle blending weight determination circuitry 502 may be instantiated by executing machine executable instructions such as those implemented by at least block 1610 of FIG. 16. Additionally or alternatively, the angle blending weight determination circuitry 502 may be instantiated by any other combination of hardware, software, and/or firmware. For example, the angle blending weight determination circuitry 502 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the steering controller 204 includes means for determining a final angle request. For example, the means for determining the final angle request may be implemented by final angle determination circuitry 504. In some examples, the final angle determination circuitry 504 may be instantiated by programmable circuitry such as the example programmable circuitry 1812 of FIG. 18. For instance, the final angle determination circuitry 504 may be instantiated by executing machine executable instructions such as those implemented by at least block 1612 of FIG. 16. Additionally or alternatively, the final angle determination circuitry 504 may be instantiated by any other combination of hardware, software, and/or firmware. For example, the final angle determination circuitry 504 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the steering controller 204 includes means for converting the final angle request to a torque request. For example, the means for converting may be implemented by conversion circuitry 308. In some examples, the conversion circuitry 308 may be instantiated by programmable circuitry such as the example programmable circuitry 1812 of FIG. 18. For instance, the conversion circuitry 308 may be instantiated by executing machine executable instructions such as those implemented by at least blocks 1614 and 1616 of FIG. 16. Additionally or alternatively, the conversion circuitry 308 may be instantiated by any other combination of hardware, software, and/or firmware. For example, the conversion circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the steering controller 204 of FIG. 1 is illustrated in FIG. 2, one or more of the elements, processes, and/or devices illustrated in FIG. 2 may be combined, divided, re-arranged, omitted, eliminated, and/or implemented in any other way. Further, the example VBC circuitry 302, the example PF circuitry 304, the example angle blending circuitry 306, the example conversion circuitry 308, the example main incremental angle determination circuitry 402, the example derivative incremental angle determination circuitry 404, the example R2C incremental angle determination circuitry 406, the example damping incremental angle determination circuitry 408, the VBC angle determination circuitry 410, the example angle blending weight determination circuitry 502, the example final angle determination circuitry 504, and/or, more generally, the example steering controller 204 of FIG. 2, may be implemented by hardware alone or by hardware in combination with software and/or firmware. Thus, for example, any of the example VBC circuitry 302, the example PF circuitry 304, the example angle blending circuitry 306, the example conversion circuitry 308, the example main incremental angle determination circuitry 402, the example derivative incremental angle determination circuitry 404, the example R2C incremental angle determination circuitry 406, the example damping incremental angle determination circuitry 408, the VBC angle determination circuitry 410, the example angle blending weight determination circuitry 502, the example final angle determination circuitry 504, and/or, more generally, the example steering controller 204, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example steering controller 204 of FIG. 2 may include one or more elements, processes, and/or devices in addition to, or instead of, those illustrated in FIG. 2, and/or may include more than one of any or all of the illustrated elements, processes and devices.

Figure 16:
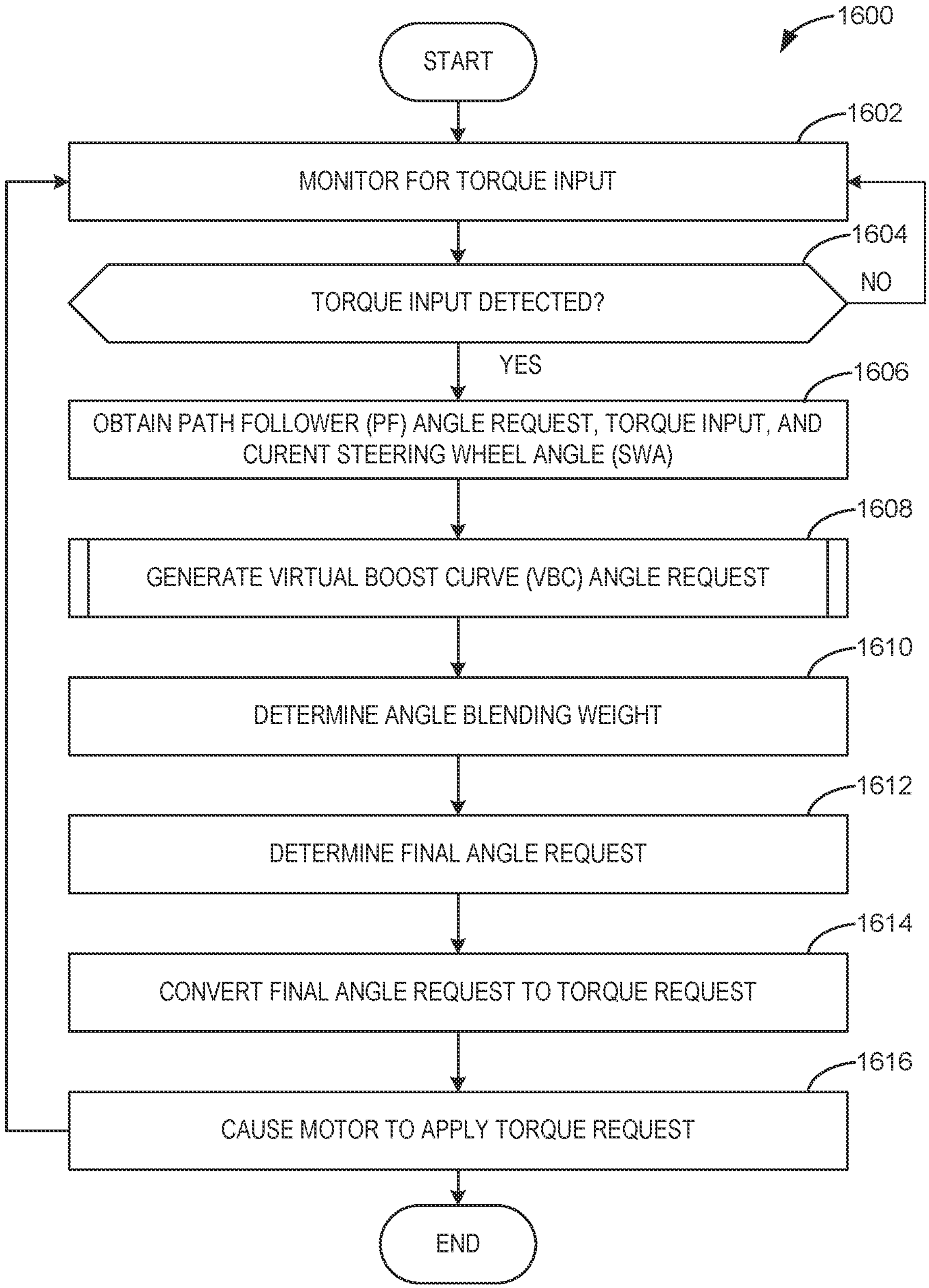
FIG. 16 is a flowchart representative of example machine readable instructions and/or example operations that may be executed, instantiated, and/or performed by example programmable circuitry to implement the example steering controller of FIGS. 2 and 3.

Flowchart(s) representative of example machine readable instructions, which may be executed by programmable circuitry to implement and/or instantiate the steering controller 204 of FIG. 2 and/or representative of example operations which may be performed by programmable circuitry to implement and/or instantiate the steering controller 204 of FIG. 2, are shown in FIGS. 16 and/or 17. The machine readable instructions may be one or more executable programs or portion(s) of one or more executable programs for execution by programmable circuitry such as the programmable circuitry 1812 shown in the example processor platform 1800 discussed below in connection with FIG. 18 and/or may be one or more function(s) or portion(s) of functions to be performed by other example programmable circuitry, such as an FPGA. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 16 and/or 17, many other methods of implementing the example steering controller 204 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 16 and/or 17 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 16 is a flowchart representative of example machine readable instructions and/or example operations 1600 that may be executed, instantiated, and/or performed by programmable circuitry to adjust a steering angle of a vehicle. The example operation of FIG. 16 assumes the vehicle 100 is in the self-driving mode. The example machine-readable instructions and/or the example operations 1600 of FIG. 16 begin at blocks 1602, 1604, at which the steering controller 204 monitors for torque input. For example, the torque sensor 222 measures torque applied to the steering wheel 206 by the driver. At block 1602, the VBC circuitry 302 accesses signals from the torque sensor 222 and can determine the torque input (if any) based on the output signals of the torque sensor 222. At block 1604, the VBC circuitry 302 determines whether any torque input has been detected. If no torque input is detected, control proceeds back to block 1602 and the VBC circuitry 302 continues to monitor for torque input. In some examples, the VBC circuitry 302 performs this check at a particular frequency set by a clock (e.g., at 100 hertz (hz)).

If torque input is detected, at block 1606, the steering controller 204 (FIG. 2) accesses or obtains the PF angle request, the torque input, and the current SWA. For example, the angle blending circuitry 306 can query the PF circuitry 304 for an instantaneous PF angle request. The VBC circuitry 302 can access an output of the torque sensor 222 (FIG. 2) and determine a torque input based on the sensor output (as discussed above in connection with blocks 1602, 1606). The VBC circuitry 302 can access the current SWA from the SWA sensor 224.

At block 1608, the steering controller 204 generates the VBC angle request. For example, the VBC circuitry 302 determines various incremental angles and combines them with the current SWA to generate the VBC angle request. Further details regarding block 1608 are described below in connection with FIG. 17.

At block 1610, the steering controller 204 determines an angle blending weight. For example, the angle blending circuitry 306 and/or the angle blending weight determination circuitry 502 computes the angle blending weight based on the driver input torque and the vehicle speed. In some examples, the angle blending weight circuitry 306 and or the angle blending weight determination circuitry 502 executes and/or performs the example operations 700 of FIG. 7 to determine the angle blending weight.

At block 1612, the steering controller 204 determines a final angle request. For example the angle blending circuitry 306 and/or the final angle determination circuitry 504 blends the VBC angle request, the PF angle request, and the angle blending weight to calculate the final angle request. In some examples, the angle blending weight circuitry 306 and or the final angle determination circuitry 504 executes and/or performs the example operations 900 of FIG. 9 to determine the final angle request.

At block 1614, this steering controller 204 converts the final angle request to a torque request. For example, the conversion circuitry 308 of FIG. 3 calculates the torque that would cause the steering wheel 206 to rotate or turn to the steering angle associated with the final angle request. At block 1616, the steering controller 204 causes the motor 214 to apply the torque request on the steering system 200 (e.g., on the rack 212) of the vehicle 100 to achieve the final angle request. For example, the conversion circuitry 308 sends the torque request to the motor 214 with a command to apply the torque request to the gear rack 212, which thereby adjusts the steering angle of the vehicle 100 to the steering angle associated with the final angle request.

In some examples, control proceeds back to block 1602 and the steering controller 204 continues to monitor for additional torque input, such as when the driver is applying torque to the steering wheel 206. The example process may be repeated continuously while the vehicle 100 is in the self-driving mode. However, if the self-driving mode is deactivated and/or the vehicle 100 is turned off, the example process and/or operation 1600 ends.

Figure 17:
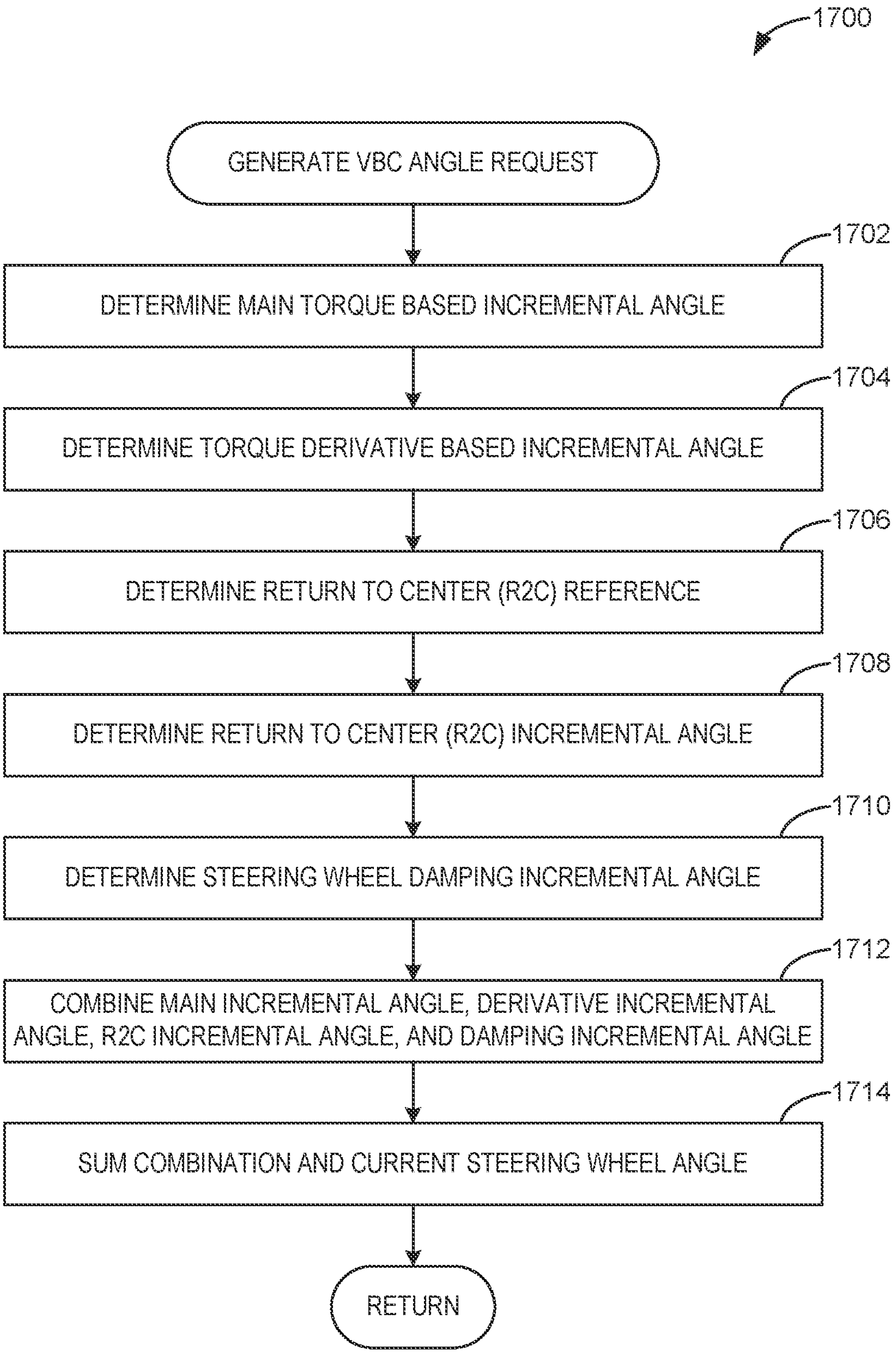
FIG. 17 is a flowchart representative of example machine readable instructions and/or example operations that may be executed, instantiated, and/or performed by example programmable circuitry to implement the example steering controller of FIGS. 2 and 3.

FIG. 17 is a flowchart representative of example machine readable instructions and/or example operations 1700 that may be executed, instantiated, and/or performed by programmable circuitry to generate the VBC angle request. The example machine-readable instructions and/or the example operations 1700 of FIG. 17 may correspond to the operation(s) performed at block 1608 of FIG. 16. The example machine-readable instructions and/or the example operations 1700 of FIG. 17 begin at block 1702, at which the steering controller 204 (FIG. 2) determines a main torque based incremental angle. For example, the VBC circuitry 302 (FIG. 3) and/or the main incremental angle determination circuitry 402 of FIG. 4 determines the main incremental angle based on the operations 1000 of FIG. 10.

At block 1704, the steering controller 204 (FIG. 2) determines a torque derivative based incremental angle. For example, the VBC circuitry 302 (FIG. 3) and/or the derivative incremental angle determination circuitry 404 of FIG. 4 determines the derivative incremental angle based on the operations 1100 of FIG. 11.

At block 1706, the steering controller 204 (FIG. 2) determines an R2C reference. For example, the VBC circuitry 302 (FIG. 3) and/or the R2C angle determination circuitry 406 of FIG. 4 determines the R2C reference based on the operations 1400 of FIG. 14. At block 1708, the steering controller 204 (FIG. 2) determines an R2C incremental angle. For example, the VBC circuitry 302 (FIG. 3) and/or the R2C angle determination circuitry 406 of FIG. 4 determines the R2C incremental angle based on the operations 1300 of FIG. 13.

At block 1710, the steering controller 204 (FIG. 2) determines a steering wheel damping incremental angle. For example, the VBC circuitry 302 (FIG. 3) and/or the damping incremental angle determination circuitry 408 of FIG. 4 determines the damping incremental angle based on the operations 1500 of FIG. 15.

At block 1712, the steering controller 204 (FIG. 2) combines the main incremental angle, the derivative incremental angle, the R2C incremental angle, and the damping incremental angle. For example, the VBC circuitry 302 (FIG. 3) and/or the VBC angle determination circuitry 410 of FIG. 4 combines the incremental angles based on the operations 900 of FIG. 9. At block 1714, the steering controller 204 (FIG. 2) sums the combination of block 1712 with the current SWA. For example, the VBC circuitry 302 (FIG. 3) and/or the VBC angle determination circuitry 410 of FIG. 4 adds the combination to the current SWA based on the operations 900 of FIG. 9. After block 1714, control returns to block 1610 of FIG. 16.

Figure 18:
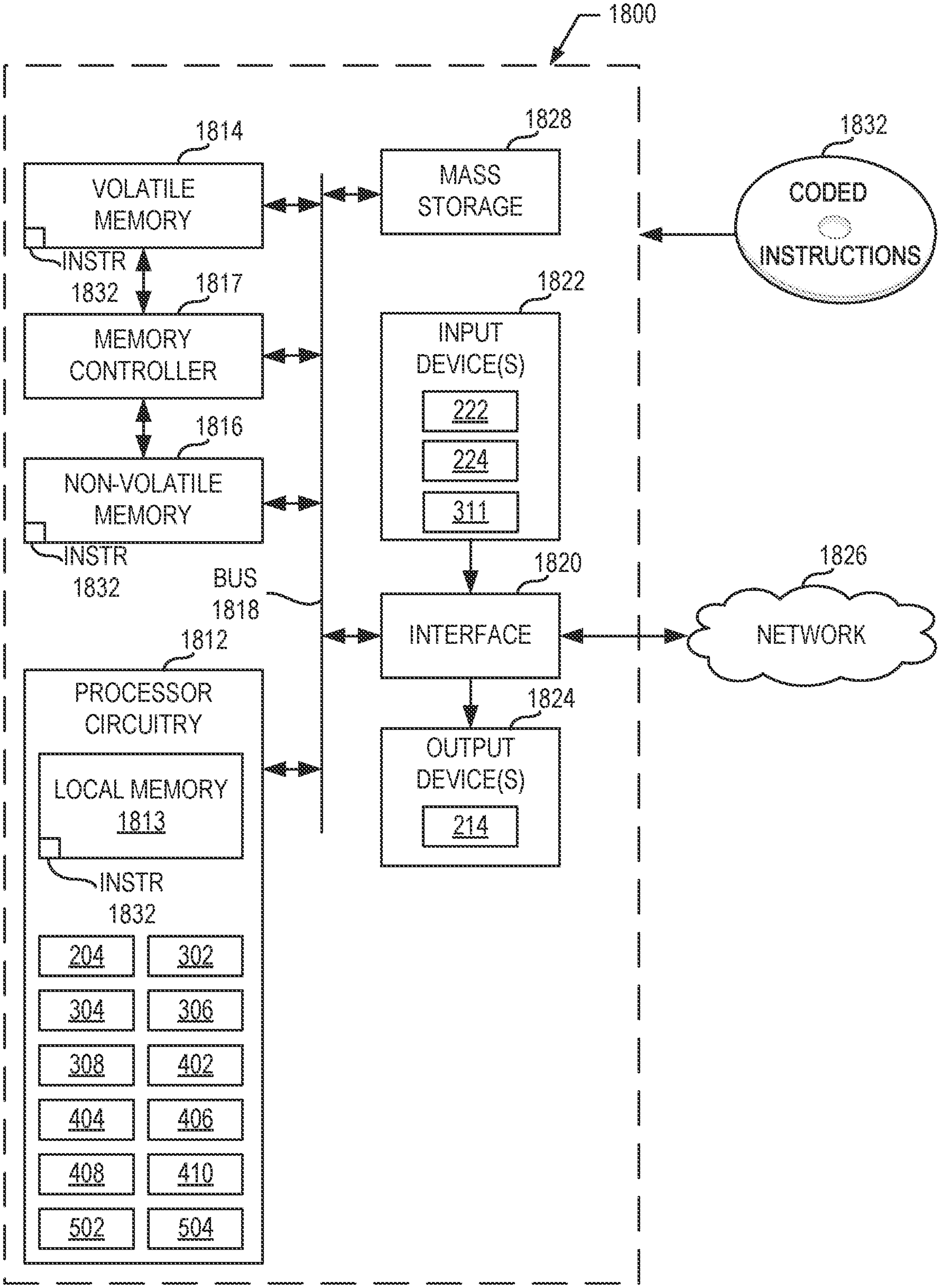
FIG. 18 is a block diagram of an example processing platform including programmable circuitry structured to execute, instantiate, and/or perform the example machine readable instructions and/or perform the example operations of FIGS. 16 and/or 17 to implement the example steering controller of FIGS. 2 and 3.

FIG. 18 is a block diagram of an example programmable circuitry platform 1800 structured to execute and/or instantiate the example machine-readable instructions and/or the example operations of FIGS. 16 and/or 17 to implement the steering controller 204 of FIG. 2. The programmable circuitry platform 1800 can be, for example, an electronic or engine control unit (ECU) of a vehicle, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing and/or electronic device.

The programmable circuitry platform 1800 of the illustrated example includes programmable circuitry 1812. The programmable circuitry 1812 of the illustrated example is hardware. For example, the programmable circuitry 1812 can be implemented by one or more integrated circuits, logic circuits, FPGAs, microprocessors, CPUs, GPUs, DSPs, and/or microcontrollers from any desired family or manufacturer. The programmable circuitry 1812 may be implemented by one or more semiconductor based (e.g., silicon based) devices. In this example, the programmable circuitry 1812 implements the example VBC circuitry 302, the example PF circuitry 304, the example angle blending circuitry 306, the example conversion circuitry 308, the example main incremental angle determination circuitry 402, the example derivative incremental angle determination circuitry 404, the example R2C incremental angle determination circuitry 406, the example damping incremental angle determination circuitry 408, the VBC angle determination circuitry 410, the example angle blending weight determination circuitry 502, the example final angle determination circuitry 504, and/or, more generally, the steering controller 204.

The programmable circuitry 1812 of the illustrated example includes a local memory 1813 (e.g., a cache, registers, etc.). The programmable circuitry 1812 of the illustrated example is in communication with main memory 1814, 1816, which includes a volatile memory 1814 and a non-volatile memory 1816, by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817. In some examples, the memory controller 1817 may be implemented by one or more integrated circuits, logic circuits, microcontrollers from any desired family or manufacturer, or any other type of circuitry to manage the flow of data going to and from the main memory 1814, 1816.

The programmable circuitry platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user (e.g., a human user, a machine user, etc.) to enter data and/or commands into the programmable circuitry 1812. The input device(s) 1822 may include the torque sensor 222, the SWA sensor 224, and the speed sensor 311. Additionally or alternatively, the input device(s) 1822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1824 are also connected to the interface circuitry 1820 of the illustrated example. The output device(s) 1824 can include the motor 214. Additionally or alternatively, the output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1800 of the illustrated example also includes one or more mass storage discs or devices 1828 to store firmware, software, and/or data. Examples of such mass storage discs or devices 1828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1832, which may be implemented by the machine readable instructions of FIGS. 16 and/or 17, may be stored in the mass storage device 1828, in the volatile memory 1814, in the non-volatile memory 1816, and/or on at least one non-transitory computer readable storage medium such as a CD or DVD which may be removable.

From the foregoing, it will be appreciated that example systems, apparatus, articles of manufacture, and methods have been disclosed that adjust the steering wheel angle of a vehicle. Disclosed systems, apparatus, articles of manufacture, and methods improve the efficiency of using a computing device and a steering system of a vehicle by enabling an angle control interface for an angle based self-driving control system of the vehicle. Disclosed systems, apparatus, articles of manufacture, and methods are accordingly directed to one or more improvement(s) in the operation of a machine such as a computer or other electronic and/or mechanical device.

Examples and combinations of examples disclosed herein include the following:

Example 1 is a vehicle comprising a steering wheel, a steerable wheel, the steering wheel operatively coupled to the steerable wheel, a steering motor to be activated to control a steering angle of the steering wheel while the vehicle is in a self-driving mode, and a steering controller including instructions and programmable circuitry to execute the instructions to: access a path follower (PF) angle request, generate a virtual boost curve (VBC) angle request based on a torque input to the steering wheel by a driver, determine an angle blending weight based on the torque input and a speed of the vehicle, determine a final angle request based on the PF angle request, the VBC angle request, and the angle blending weight, and convert the final angle request to a torque request to be used to adjust the steering angle via the motor.

Example 2 includes the vehicle of Example 1, wherein the programmable circuitry is to determine the final angle request by summing a first product and a second product. The first product is between the angle blending weight and the VBC angle request, and the second product is between one minus the angle blending weight and the PF angle request.

Example 3 includes the vehicle of Example 2, wherein the angle blending weight is a value from zero to one.

Example 4 includes the vehicle of any of Examples 1-3, wherein the VBC angle request corresponds to a combination of a main incremental angle, a derivative incremental angle, a return to center incremental angle, and a damping incremental angle.

Example 5 includes the vehicle of Example 4, wherein the programmable circuitry is to sum the combination and a current steering wheel angle (SWA) to generate the VBC angle request.

Example 6 includes the vehicle of Examples 4 or 5, wherein the main incremental angle corresponds to a product of a delta SWA, a virtual wall weight, and a velocity-based weight. The programmable circuitry is to determine the delta SWA, the virtual wall weight, and the velocity-based weight based on a plurality of lookup tables.

Example 7 includes the vehicle of any of Examples 1-6, further including a torque sensor to detect a torque on a torsion bar of the vehicle. The programmable circuitry is to determine the input torque based on an output from the torque sensor.

Example 8 is a non-transitory machine readable storage medium comprising instructions to cause programmable circuitry to at least: access a path follower (PF) angle request, generate a virtual boost curve (VBC) angle request based on a torque input to a steering wheel of a vehicle by a driver, determine an angle blending weight based on the torque input and a speed of the vehicle, determine a final angle request based on the PF angle request, the VBC angle request, and the angle blending weight, and convert the final angle request to a torque request to be used to adjust a steering angle of the steering wheel while the vehicle is in a self-driving mode.

Example 9 includes the non-transitory machine readable storage medium of Example 8, wherein the final angle request corresponds to a summation of a first product and a second product. The first product is between the angle blending weight and the VBC angle request, and the second product is between one minus the angle blending weight and the PF angle request.

Example 10 includes the non-transitory machine readable storage medium of Example 9, wherein the angle blending weight is a value from zero to one.

Example 11 includes the non-transitory machine readable storage medium of any of Examples 8-10, wherein the VBC angle request corresponds to a combination of a main incremental angle, a derivative incremental angle, a return to center incremental angle, and a damping incremental angle.

Example 12 includes the non-transitory machine readable storage medium of Example 11, wherein the instructions are to cause programmable circuitry to sum the combination and a current steering wheel angle to generate the VBC angle request.

Example 13 includes the non-transitory machine readable storage medium of Examples 11 or 12, wherein the main incremental angle corresponds to a product of a delta SWA, a virtual wall weight, and a velocity-based weight. The instructions cause programmable circuitry to determine the delta SWA, the virtual wall weight, and the velocity-based weight based on a plurality of lookup tables.

Example 14 includes the non-transitory machine readable storage medium of any of Examples 8-13, wherein the instructions cause the programmable circuitry to determine the torque input based on an output signal from a torque sensor on a torsion bar of the vehicle.

Example 15 is a method comprising accessing a path follower (PF) angle request, generating a virtual boost curve (VBC) angle request based on a torque input to a steering wheel of a vehicle by a driver, determining an angle blending weight based on the torque input and a speed of the vehicle, determining a final angle request based on the PF angle request the VBC angle request, and the angle blending weight, and converting the final angle request to a torque request to be used to adjust a steering angle of the steering wheel of the vehicle.

Example 16 includes the method of Example 15, wherein the final angle request corresponds to a summation of a first product and a second product. The first product is between the angle blending weight and the VBC angle request, the second product is between one minus the angle blending weight and the PF angle request.

Example 17 includes the method of Example 16, wherein the angle blending weight is a value from zero to one.

Example 18 includes the method of any of Examples 15-17, wherein the VBC angle request corresponds to a combination of a main incremental angle, a derivative incremental angle, a return to center incremental angle, and a damping incremental angle.

Example 19 includes the method of Example 18, further including summing the combination and a current steering wheel angle to generate the VBC angle request.

Example 20 includes the method of Examples 18 or 19, wherein the main incremental angle corresponds to a product of a delta SWA, a virtual wall weight, and a velocity-based weight. The method further includes determining the delta SWA, the virtual wall weight, and the velocity-based weight based on a plurality of lookup tables.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A vehicle comprising:

a steering wheel;

a steerable wheel, the steering wheel operatively coupled to the steerable wheel;

a steering motor to be activated to control a steering angle of the steering wheel while the vehicle is in a self-driving mode; and a steering controller including instructions and programmable circuitry to execute the instructions to:

access a path follower (PF) angle request;

generate a virtual boost curve (VBC) angle request based on a combination of a main incremental angle, a derivative incremental angle, a return to center incremental angle, and a damping incremental angle;

determine an angle blending weight based on (a) a torque input to the steering wheel by a driver and (b) a speed of the vehicle;

determine a final angle request based on the PF angle request, the VBC angle request, and the angle blending weight;

convert the final angle request to a torque request to be used to adjust the steering angle via the steering motor; and cause steering of the vehicle based on the torque request.

2. The vehicle of claim 1, wherein the programmable circuitry is to determine the final angle request by summing a first product and a second product, the first product being between the angle blending weight and the VBC angle request, the second product being between one minus the angle blending weight and the PF angle request.

3. The vehicle of claim 2, wherein the angle blending weight is a value from zero to one.

4. The vehicle of claim 1, wherein the programmable circuitry is to sum the combination and a current steering wheel angle (SWA) to generate the VBC angle request.

5. The vehicle of claim 1, wherein the main incremental angle corresponds to a product of a delta SWA, a virtual wall weight, and a velocity-based weight, the programmable circuitry to determine the delta SWA, the virtual wall weight, and the velocity-based weight based on a plurality of lookup tables.

6. The vehicle of claim 1, further including a torque sensor to detect a torque on a torsion bar of the vehicle, the programmable circuitry to determine the torque input torque based on an output from the torque sensor.

7. The vehicle of claim 1, wherein the programmable circuitry is to generate the VBC angle request by:

determining a sum of the main incremental angle and the derivative incremental angle; and subtracting, from the sum, the return to center incremental angle and the damping incremental angle.

8. The vehicle of claim 1, wherein the programmable circuitry is to:

determine a gain value based on the speed of the vehicle;

determine a preliminary derivative incremental angle based on a derivative of the torque input; and determine the derivative incremental angle based on a product of the gain value and the preliminary derivative incremental angle.

9. The vehicle of claim 1, wherein the programmable circuitry is to:

determine a return to center reference based on the speed of the vehicle, a curvature of a current path of the vehicle, and the PF angle request; and determine the return to center incremental angle based on the return to center reference, a current steering wheel angle of the steering wheel, and the speed of the vehicle.

10. A non-transitory machine readable storage medium comprising instructions to cause programmable circuitry to at least:

access a path follower (PF) angle request;

generate a virtual boost curve (VBC) angle request based on a combination of a main incremental angle, a derivative incremental angle, a return to center incremental angle, and a damping incremental angle;

determine an angle blending weight based on (a) a torque input to a steering wheel of a vehicle by a driver and (b) a speed of the vehicle;

determine a final angle request based on the PF angle request, the VBC angle request, and the angle blending weight;

convert the final angle request to a torque request to be used to adjust a steering angle of the steering wheel while the vehicle is in a self-driving mode; and cause steering of the vehicle based on the torque request.

11. The non-transitory machine readable storage medium of claim 10, wherein the final angle request corresponds to a summation of a first product and a second product, the first product being between the angle blending weight and the VBC angle request, the second product being between one minus the angle blending weight and the PF angle request.

12. The non-transitory machine readable storage medium of claim 11, wherein the angle blending weight is a value from zero to one.

13. The non-transitory machine readable storage medium of claim 10, wherein the instructions are to cause programmable circuitry to sum the combination and a current steering wheel angle to generate the VBC angle request.

14. The non-transitory machine readable storage medium of claim 10, wherein the main incremental angle corresponds to a product of a delta SWA, a virtual wall weight, and a velocity-based weight, the instructions to cause programmable circuitry to determine the delta SWA, the virtual wall weight, and the velocity-based weight based on a plurality of lookup tables.

15. The non-transitory machine readable storage medium of claim 10, wherein the instructions cause the programmable circuitry to determine the torque input based on an output signal from a torque sensor on a torsion bar of the vehicle.

16. A method comprising:

accessing a path follower (PF) angle request;

generating a virtual boost curve (VBC) angle request based on a combination of a main incremental angle, a derivative incremental angle, a return to center incremental angle, and a damping incremental angle;

determining an angle blending weight based on (a) a torque input to a steering wheel of a vehicle by a driver and (b) a speed of the vehicle;

determining a final angle request based on the PF angle request the VBC angle request, and the angle blending weight;

converting the final angle request to a torque request to be used to adjust a steering angle of the steering wheel of the vehicle; and causing steering of the vehicle based on the torque request.

17. The method of claim 16, wherein the final angle request corresponds to a summation of a first product and a second product, the first product being between the angle blending weight and the VBC angle request, the second product being between one minus the angle blending weight and the PF angle request.

18. The method of claim 17, wherein the angle blending weight is a value from zero to one.

19. The method of claim 16, further including summing the combination and a current steering wheel angle to generate the VBC angle request.

20. The method of claim 16, wherein the main incremental angle corresponds to a product of a delta SWA, a virtual wall weight, and a velocity-based weight, further including determining the delta SWA, the virtual wall weight, and the velocity-based weight based on a plurality of lookup tables.

* * * * *